United States Patent [19]

Mossell et al.

[11] 4,288,270
[45] Sep. 8, 1981

[54] HEAT-SEALING STRAPPING MACHINE

[75] Inventors: Alan T. Mossell; James R. Simmons, both of Homewood; Charles G. Middleton, Schaumburg, all of Ill.

[73] Assignee: Interlake, Inc., Oak Brook, Ill.

[21] Appl. No.: 45,224

[22] Filed: Jun. 4, 1979

[51] Int. Cl.³ .................. B30B 15/34; B65B 13/32
[52] U.S. Cl. ........................ 156/359; 100/33 PB; 156/389; 156/497; 156/499; 156/502; 156/522; 156/583.1
[58] Field of Search ............ 100/26, 33 PB; 156/499, 156/583.6, 583.7, 389, 522, 359, 502, 497, 583.1

[56] References Cited
U.S. PATENT DOCUMENTS

| | | | |
|---|---|---|---|
| 2,825,930 | 3/1958 | Gaillard | 156/583.7 |
| 3,269,300 | 8/1966 | Billett | 100/8 |
| 3,293,099 | 12/1966 | Stark | 156/389 |
| 3,368,323 | 2/1968 | Wood | 156/499 |
| 3,438,833 | 4/1969 | Nakano | 100/33 PB |
| 3,759,169 | 9/1973 | Goodley | 100/29 |
| 3,914,153 | 10/1975 | Sato | 156/499 |
| 3,944,460 | 3/1976 | Karr | 156/499 |
| 4,016,023 | 4/1977 | Takami | 156/499 |
| 4,058,053 | 11/1977 | Paterson | 100/33 PB |
| 4,157,274 | 6/1979 | Johnson | 156/499 |

OTHER PUBLICATIONS

Interlake Instruction Manual, G18 Strapping Head, Form 1256, 1976.

*Primary Examiner*—Michael G. Wityshyn
*Attorney, Agent, or Firm*—Vogel, Dithmar, Stotland, Stratman & Levy

[57] ABSTRACT

There is disclosed a strapping machine for applying a plastic strap around an object, tensioning the strap and heat-sealing together overlapping portions of the strap, including a retractable heating member movable between the overlapping strap portions and a pressure-applying means including a pressure block with a tiltable universal joint coupling for pressing the overlapping strap portions against the heating element with a first relatively light pressure to melt the facing surfaces thereof. The heating element is withdrawn while the pressure-applying means presses the strap thereagainst with the first pressure, and then the melted strap portions are pressed together with a strong second pressure to complete the seal. A cam with a yieldable section controls the first pressure and a compression spring controls the second pressure. While retracted, the heating element is raised to a higher temperature for burn-off of strap residues. Switch means disposed in the strap path provide a positive stop to prevent strap overfeed while a yieldable track section permits escape of excess strap from the path to prevent jamming. Air filter means remove waste products of the heat-sealing operation.

15 Claims, 19 Drawing Figures

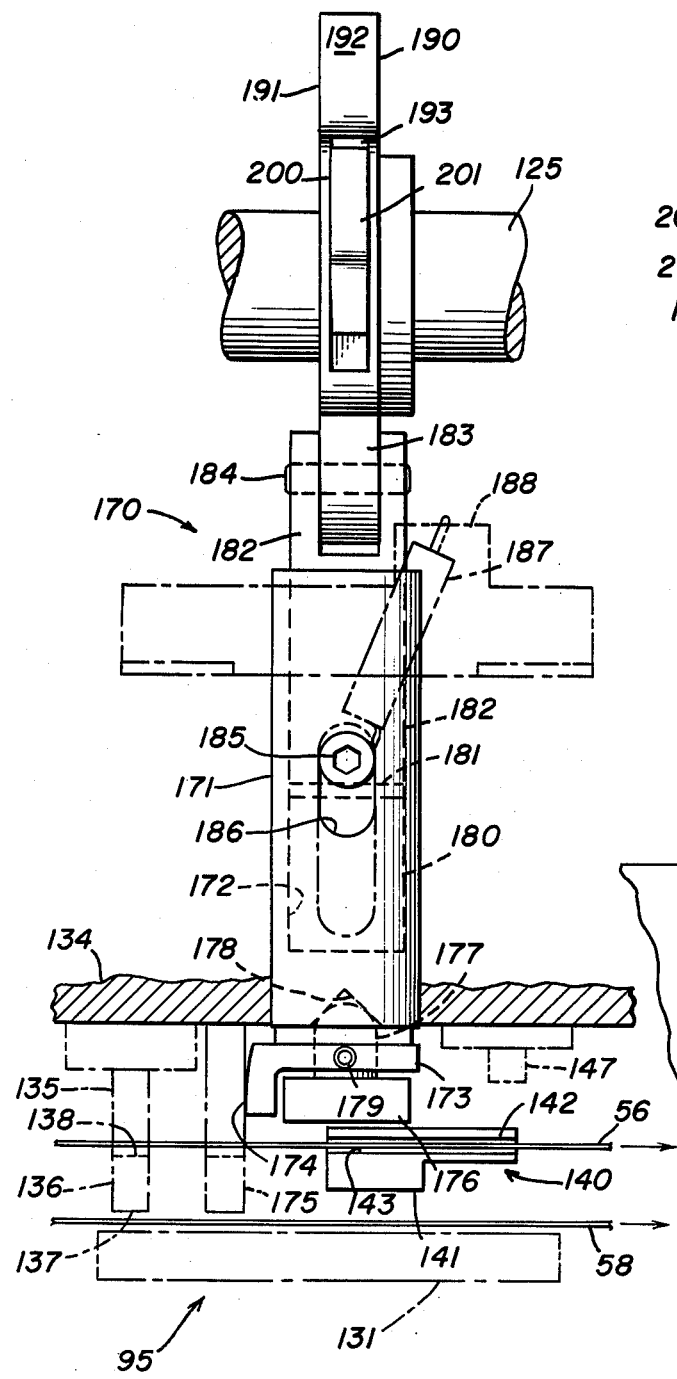
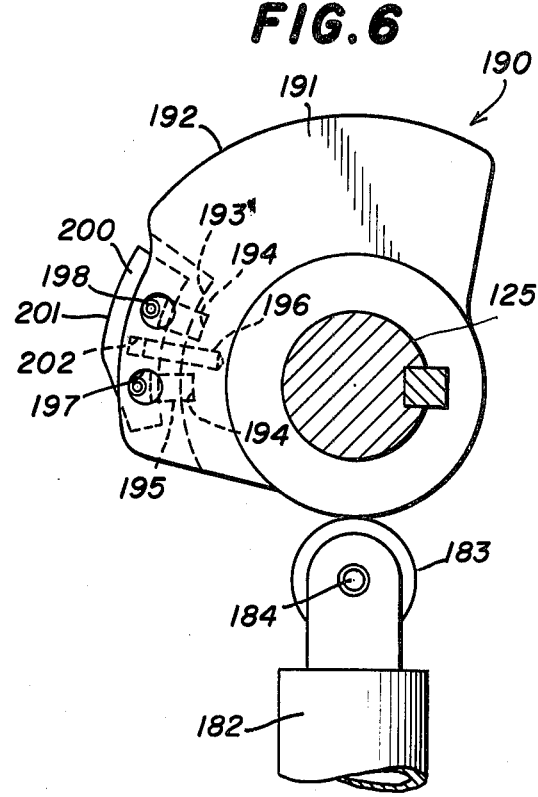
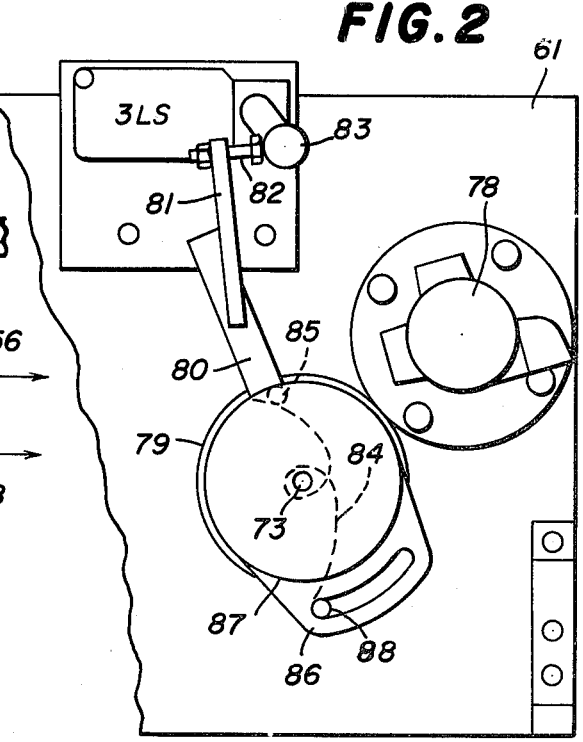

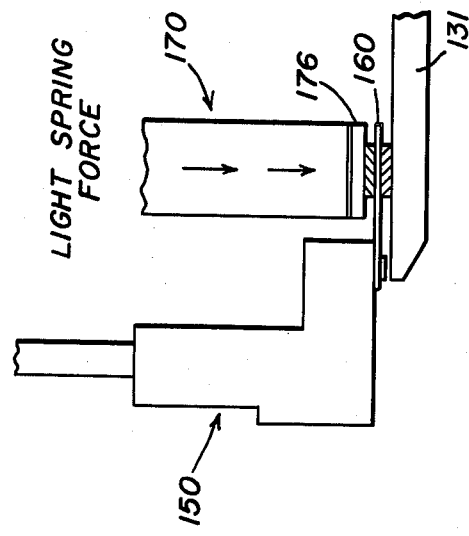
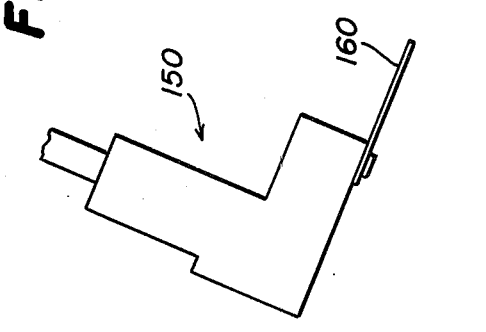
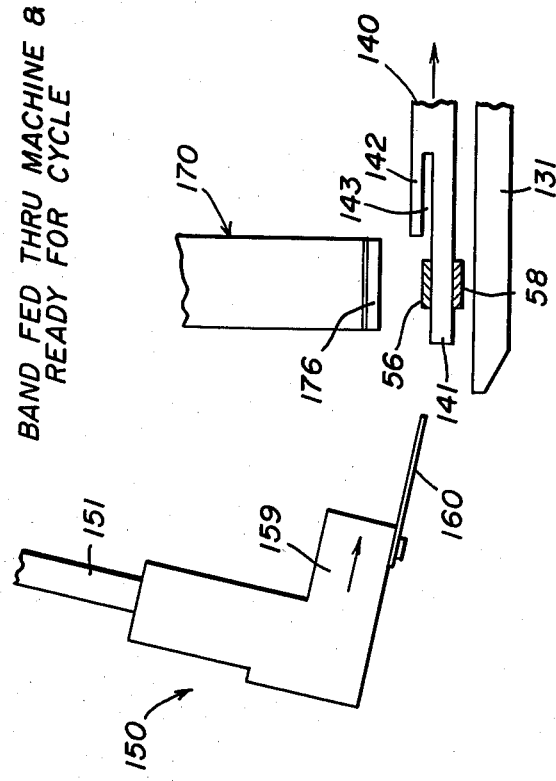
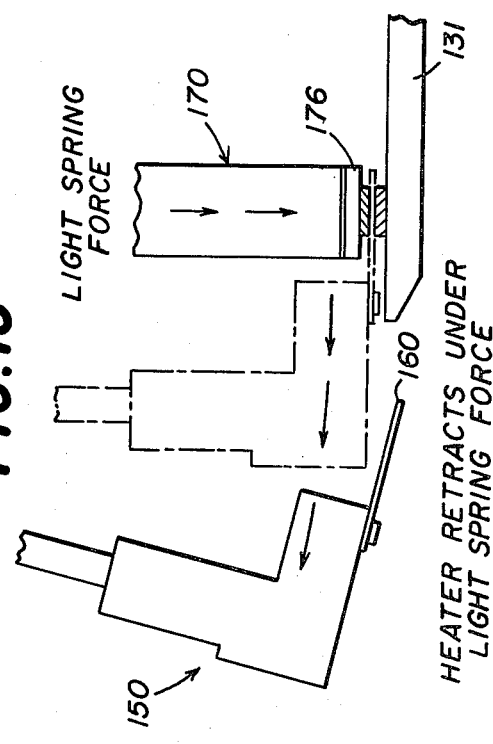

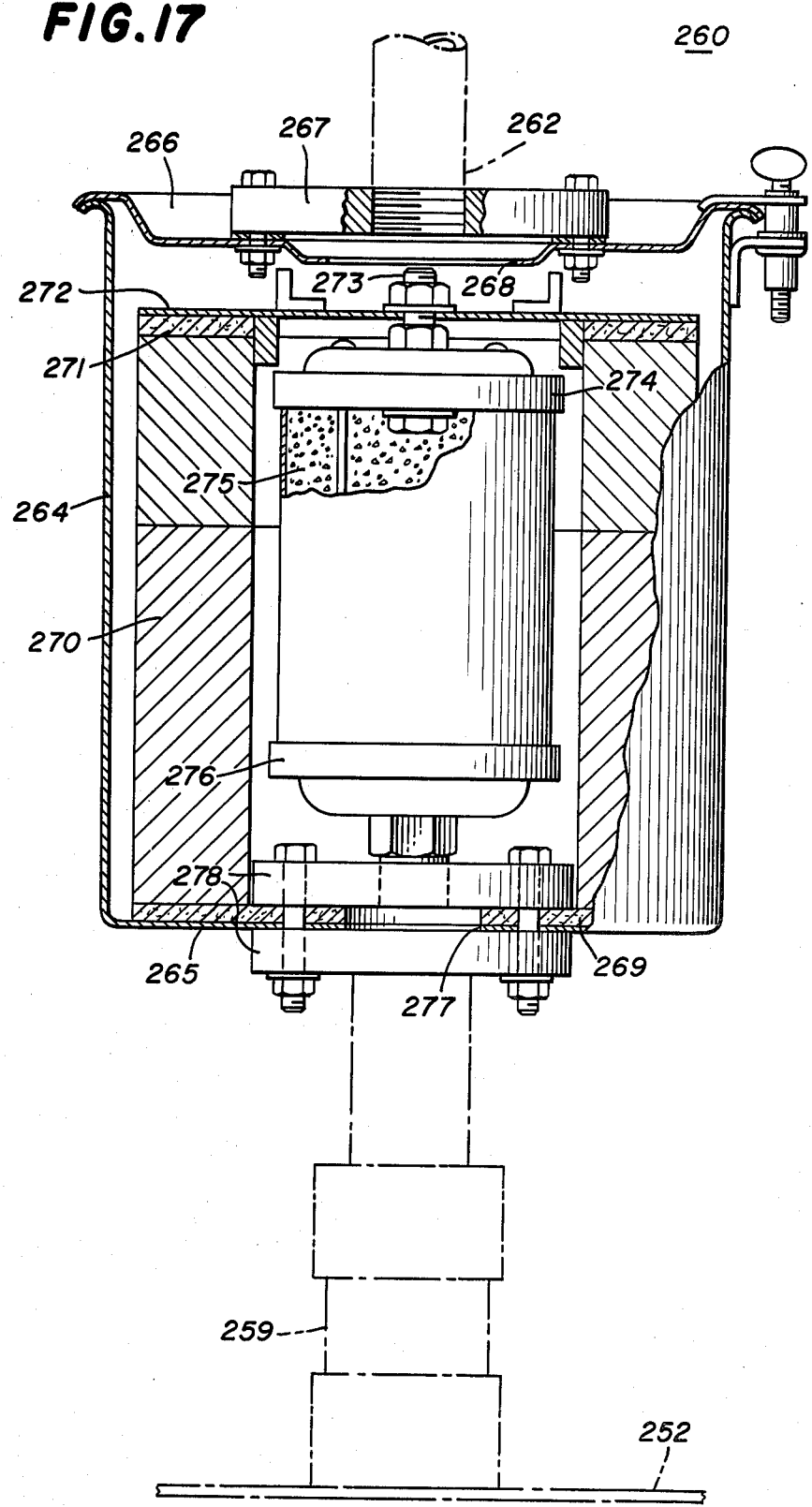

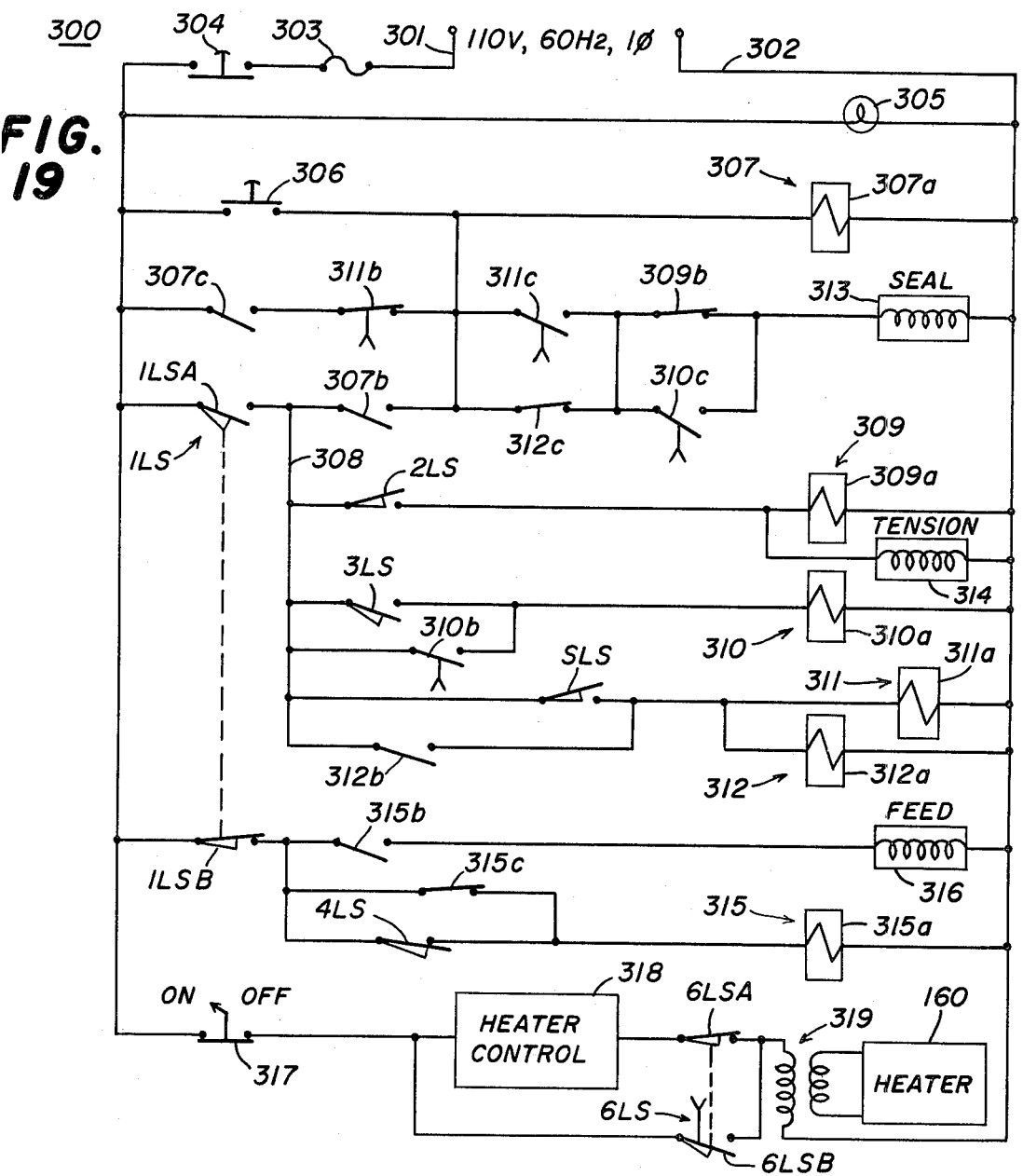
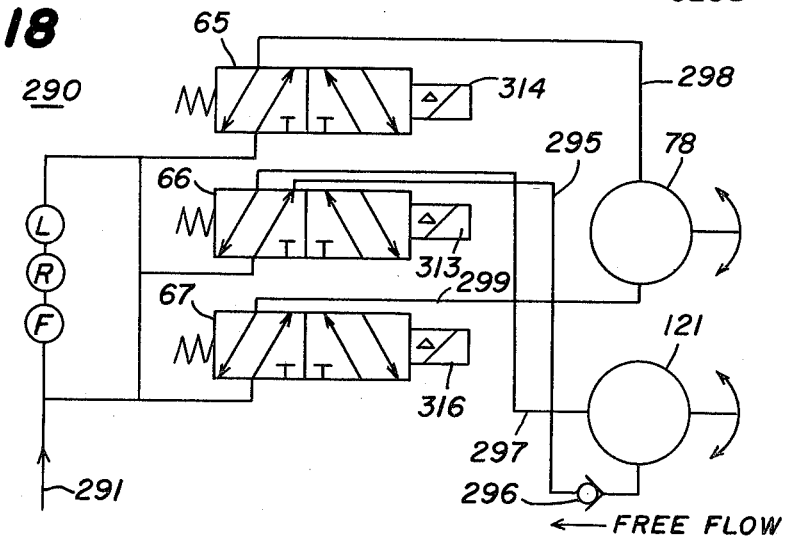

HEAT-SEALING STRAPPING MACHINE

BACKGROUND OF THE INVENTION AND PRIOR ART STATEMENT

The present invention relates to an improved strapping machine and, in particular, a machine of the type for applying and tensioning a plastic strap around an object and forming a heat-sealed joint between overlapping portions of the strap.

This invention is an improvement of the strapping machine manufactured by Interlake, the assignee of the present invention, and described in an Interlake instruction manual entitled "G18 Strapping Head" (Form 1256), Copyright 1976, and partially disclosed in U.S. Pat. No. 4,058,053, issued to F. J. Patterson et al. on Nov. 15, 1977, and assigned to the assignee of the present invention.

In the aforementioned and other prior art strapping machines the heat-sealed joint in the plastic strap is typically formed by pressing overlapping strap portions against a heating element interposed therebetween for melting the facing strap surfaces, releasing the pressure to allow the straps to separate from the heating element, removing the heating element and then again pressing the melted strap surfaces together to form the joint. Such machines have performed quite well with plastic straps such as polypropylene, polyethylene and the like. But when polyester strap is used, these prior art devices have performed unsatisfactorily in bonding the overlapping strap portions together. More specifically, it has been found that with polyester strap, during heater retraction the melted strap surfaces start to resolidify before they can be joined together, thereby impairing or destroying the integrity of the bond.

It has also been found that, occasionally, the overlapping strap portions and/or the heating element will not be aligned exactly parallel to each other or exactly perpendicular to the line of travel of the movable pressing member. This condition causes uneven contact of the strap with the heating element and can interfere with retraction of the heating element, resulting in a nonuniform and imperfect bond and, heretofore, has been eliminated only by the provision of expensive, critically machined parts.

In U.S. Pat. No. 3,269,300, issued on Aug. 30, 1966, and U.S. Pat. No. 3,759,169, issued on Sept. 18, 1973, there are disclosed strapping machines which maintain pressure on the overlapping strap portions while the heating element is being withdrawn from therebetween, but these systems still suffer from the effects of nonparallel strap and/or heating element conditions, referred to above. The apparatus of the U.S. Pat. No. 3,759,169 applies pressure by moving a presser plate against the overlapping strap portions by means of a cam, a higher pressure being applied after the heating element has been withdrawn. But this system provides no means for effectively controlling the magnitude of the force applied during the melting and sealing phases of the pressing operation.

Also, in prior art machines it has been found that after repeated cycles of operation, residue from the melted strap portions tends to build up on the heating element. This residue serves as an insulator impairing the heating efficiency of the heating element and the residue can be deposited in future melted strap portions.

Furthermore, while the above-referenced prior art machines utilize a sensing device for sensing the completion of the loop for de-energizing the feed means, the Interlake machine has a tendency to coast, thereby overfeeding the strap past the sealing region, resulting in wasted strap. The machine of the U.S. Pat. No. 3,759,169 provides a positive stop for the strap, but the feed motor is de-energized by the actuation of a switch in response to the creation of a deliberate overfeed condition, subsequent to the stopping of the leading end of the strap. When the coasting tendency of the air motor after de-energization is added to this deliberate overfeed, there results a considerable accumulation of excess strap which must be withdrawn at the beginning of a tensioning operation, thereby significantly lengthening the time required for the tensioning operation. Also, this arrangement suffers from a tendency of the overfed strap to jam in the switch mechanism or other portions of the track.

Copies of the above-identified instruction manual and each of the aforementioned prior art patents are filed with this application, and they represent the most pertinent prior art of which applicants are aware.

SUMMARY OF THE INVENTION

The present invention provides an improved strapping machine for tensioning and heat-sealing plastic strap around an object, which overcomes the disadvantages of prior art machines and affords additional important operational advantages.

It is a general object of this invention to provide heat-sealing apparatus for use in a strapping machine for applying plastic strap around an object which insures joinder of the melted surfaces of the overlapping strap portions before they can begin to solidify to form a solid uniform joint.

It is another object of this invention to provide a heat-sealing apparatus of the type set forth which includes pressure-applying means for pressing the overlapping strap portions against a heating element interposed therebetween which automatically compensates for any nonparallel condition thereof.

Another object of this invention is to provide a heat-sealing apparatus of the type set forth wherein the pressureapplying means presses the overlapping strap portions against the heating element with a first predetermined controlled force, continues to apply that force during retraction of the heating element and then presses the melted strap portions together with a second greater predetermined controlled force after retraction of the heating element.

Another object of this invention is the provision of a heat-sealing apparatus of the type set forth, which prevents the buildup of plastic residues on the heating element.

Still another object of this invention is the provision of a heat-sealing apparatus of the type set forth which includes filter means for removing from the air waste products of the heat-sealing operation.

Yet another object of this invention is the provision of a strapping machine for applying plastic strap in a predetermined path to form a loop around an object which includes means for quickly stopping the strap feed when the formation of the loop has been completed without strap waste.

In connection with the foregoing object, it is another object of this invention to provide a strapping machine of the type set forth, which includes means for accommodating any incidental strap overfeed without jamming the machine.

These and other objects of the invention are achieved by providing heat sealing apparatus for use in a strapping machine for applying plastic strap around an object with the leading end of the strap overlapping and spaced from the supply portion thereof in a strap-sealing region, the heat sealing apparatus comprising a heating element movable between a strap-heating position disposed in the sealing region between the overlapping portions of the strap and a retracted position displaced from between the overlapping portions of the strap, pressure-applying means including movable pressing means and cam means engageable with the pressing means for effecting movement thereof, the cam means including a resiliently yieldable portion engageable with the pressing means when the heating element is in the strap-heating position thereof for moving the pressing means to a pressing condition pressing the overlapping strap portions against the heating element with a predetermined limited force for melting the facing surfaces of the overlapping strap portions, and means for moving the heating element to the retracted position thereof while the pressing means is in the pressing condition thereof so that the melted overlapping portions of the strap are pressed together as the heating element is withdrawn from therebetween.

Further features of the invention pertain to the particular arrangement of the parts of the strapping machine whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 2 is an enlarged, fragmentary rear elevational view of the left-hand side of the strapping machine head, as viewed in FIG. 1.

FIG. 5 is an enlarged fragmentary view in partial vertical section illustrating the pressure-applying apparatus of the present invention;

FIG. 6 is a fragmentary side elevational view of the upper portion of the apparatus shown in FIG. 5, as viewed from the right-hand side thereof;

FIGS. 11 through 14 are diagrammatic views illustrating the operation of the sealing assembly during the formation of a heat seal with the machine of the present invention;

FIG. 17 is an enlarged view in partial vertical section of the filter unit of the filter assembly of FIG. 15;

FIG. 18 is a schematic circuit diagram of the pneumatic control circuitry of the strapping machine of the present invention; and FIG. 19 is a schematic circuit diagram of the electrical control circuitry of the strapping machine of the present invention.

DESCRIPTION OF THE PREFERRED EMBODIMENT

Figure 1:
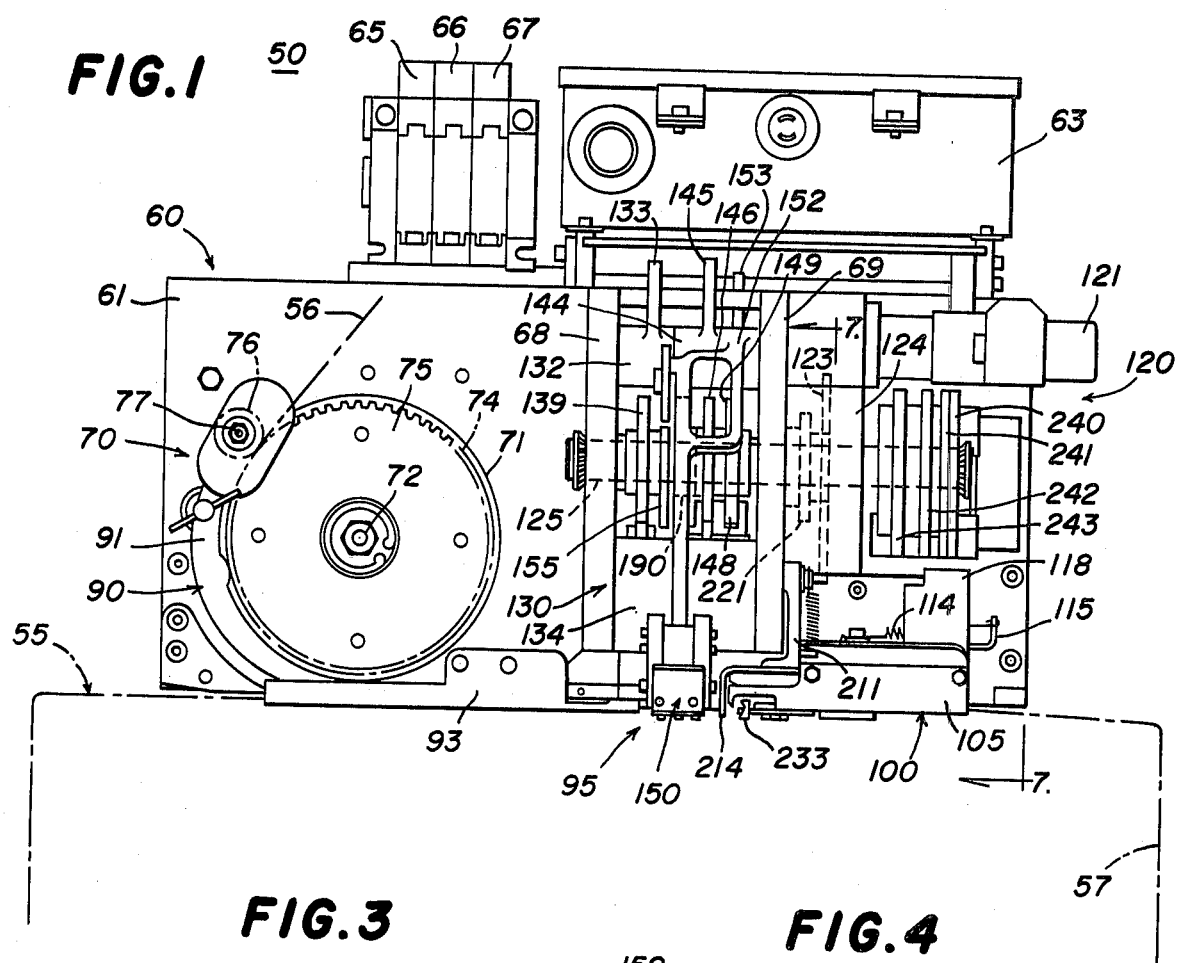
FIG. 1 is a front elevational view of a strapping machine head constructed in accordance with and embodying the features of the present invention.

Referring now to FIGS. 1 and 2 of the drawings, there is disclosed a strapping machine head, generally designated by the numeral 50, for applying around an object (not shown) a plastic strap, generally designated by the numeral 55. A supply portion 56 of the strap 55 is fed from an associated supply coil (not shown), through the strapping machine head 50, in a loop 57 around the object to be strapped and then back through the head 50 so that a leading portion 58 of the strap overlaps the supply portion 56 thereof (see FIGS. 5 and 8), all in a well-known manner, until the leading end 59 of the strap passes through a sealing region and engages a stop member, as will be explained more fully below. The strapping machine head 50 then operates to form a heat-sealed joint between the overlapping strap portions and to sever the sealed loop from the supply portion 56 of the strap. Much of the structure of the strapping machine head 50 is substantially identical to corresponding structure in the aforementioned prior Interlake strapping machines and, therefore, only so much of this common structure will be described as is necessary for a complete explanation of the novel features of the present invention.

The strapping machine head 50 has a frame, generally designated by the numeral 60, which includes a large rectangular main plate 61, along one edge of which is mounted a junction box 63 for the electrical control circuitry and three pneumatic control valves 65, 66 and 67, the operation of which will be described in detail hereinafter. Fixedly secured to the main plate 61 intermediate the ends thereof and extending therefrom substantially normal thereto are two parallel, spaced-apart sealer frame plates 68 and 69. While the head 50 has been illustrated in FIG. 1 with the main plate 61 parallel to the sheet of drawing and with the junction box 63 disposed at the upper end thereof, it will be appreciated that the head 50 could be disposed in other orientations, such as vertically with the junction box 63 disposed along one side, or with the main plate 61 disposed horizontally, i.e., normal to the plane of the sheet of drawing. The strapping machine head 50 is designed to operate in substantially any orientation.

The head 50 includes a strap feed and tension assembly, generally designated by the numeral 70, which is disposed adjacent to one end of the main plate 61 and includes a relatively large-diameter feed wheel 71 mounted for rotation about the axis of a stud 72 which is integral with but eccentric with respect to the axis of a shaft 73 mounted in a pillow block 79 disposed in a complementary aperture through the main plate 61 (see FIG. 2). The feed wheel 71 has a peripheral plastic feed ring providing a smooth feed surface 74 and is fixedly secured to a gear plate 75 disposed for meshing engagement with a gear (not shown) on the shaft 77 of a reversible air motor 78, which shaft also carries a rotary dog 76. The feed wheel 71, the gear plate 75 and rotary dog 76 are all disposed on the front side of the main plate 61, while the air motor 78 is fixedly secured to the rear side of the main plate 61, with the shaft 77 extending through a complementary opening in the main plate 61. The rotary dog 76 has a toothed drive surface disposed for cooperation with the feed surface 74 of the feed wheel 71 to frictionally grip therebetween the supply portion 56 of the strap 55 to drive the strap 55 during the feeding and tensioning operations which will be described below.

Referring in particular to FIG. 2, the rear end of the shaft 73 is fixedly secured to one end of a link 80, the other end of which is provided with an extension 81 to which is fixedly secured an actuating finger 82 disposed for engagement with the switch contact arm 83 of a limit switch 3LS mounted on the rear surface of the main plate 61. Coiled about the shaft 73 is a torsion spring 84, having one end thereof disposed in engagement with a roll pin 85 on the link 80 and having the other end thereof disposed in engagement with a screw 88 projecting rearwardly from the main plate 61. The screw 88 extends through an elongated slot in an adjusting plate 86 which is mounted for pivotal movement about the axis of the shaft 73 and is covered by a cover plate 87. The screw 88 may be loosened to permit pivotal movement of the adjusting plate 86 to adjust the tension of the spring 84, and may be tightened to lock the assembly in the desired adjustment position.

Mounted beneath the strap feed and tension assembly 70 at the front of the main plate 61 is an entry track assembly, generally designated by the numeral 90, which includes an arcuate feed track member 91 generally concentric with the feed wheel 71 and spaced a slight distance from the feed surface 74 thereof. The feed track 91 has an elongated exit end which extends tangentially from the feed wheel 71 for guiding the strap to a pair of guide members (not shown) disposed between a pair of entry side plates 93 (one shown) which are mounted on the main plate 61 and are spring biased together to define a guide track and to permit separation from each other, as will be described below. The entry track assembly 90 serves to guide the leading end 59 of the strap from the strap feed and tension assembly 70 to a sealing region of the head 50, generally designated by the numeral 95.

Referring now also to FIGS. 7 through 10 of the drawings, there is mounted on the main plate 61 on the other side of the sealing region 95 an exit track assembly, generally designated by the numeral 100, which includes a support bracket 101, to which is mounted a side wall 102 extending parallel to and defining one side of the strap path. Spaced laterally from the side wall 102 by a pair of longitudinally spaced-apart spacer blocks 103 and 104 and secured thereby by screws 106 is an elongated exit side plate 105. Helical compression springs 107 respectively surround each of the screws 106 and are retained between the heads thereof and the outer surface of the exit side plate 105 for resiliently urging the exit side plate 105 against the spacer blocks 103 and 104. Integral with the exit side plate 105 at the lower end thereof and extending laterally inwardly therefrom substantially normal thereto is a retaining flange 108, and integral with the exit side plate 105 at the upper end thereof and inclined upwardly and outwardly therefrom is a cam flange 109. The retaining flange 108 is disposed a predetermined distance below the spacer blocks 103 and 104 and cooperates with the exit side plate 105 and the side wall 102 to define a portion of the strap track. It will be appreciated that the springs 107 permit the exit side plate 105 to be moved outwardly with respect to the spacer blocks 103 and 104 for a purpose to be explained more fully below.

Figure 8:
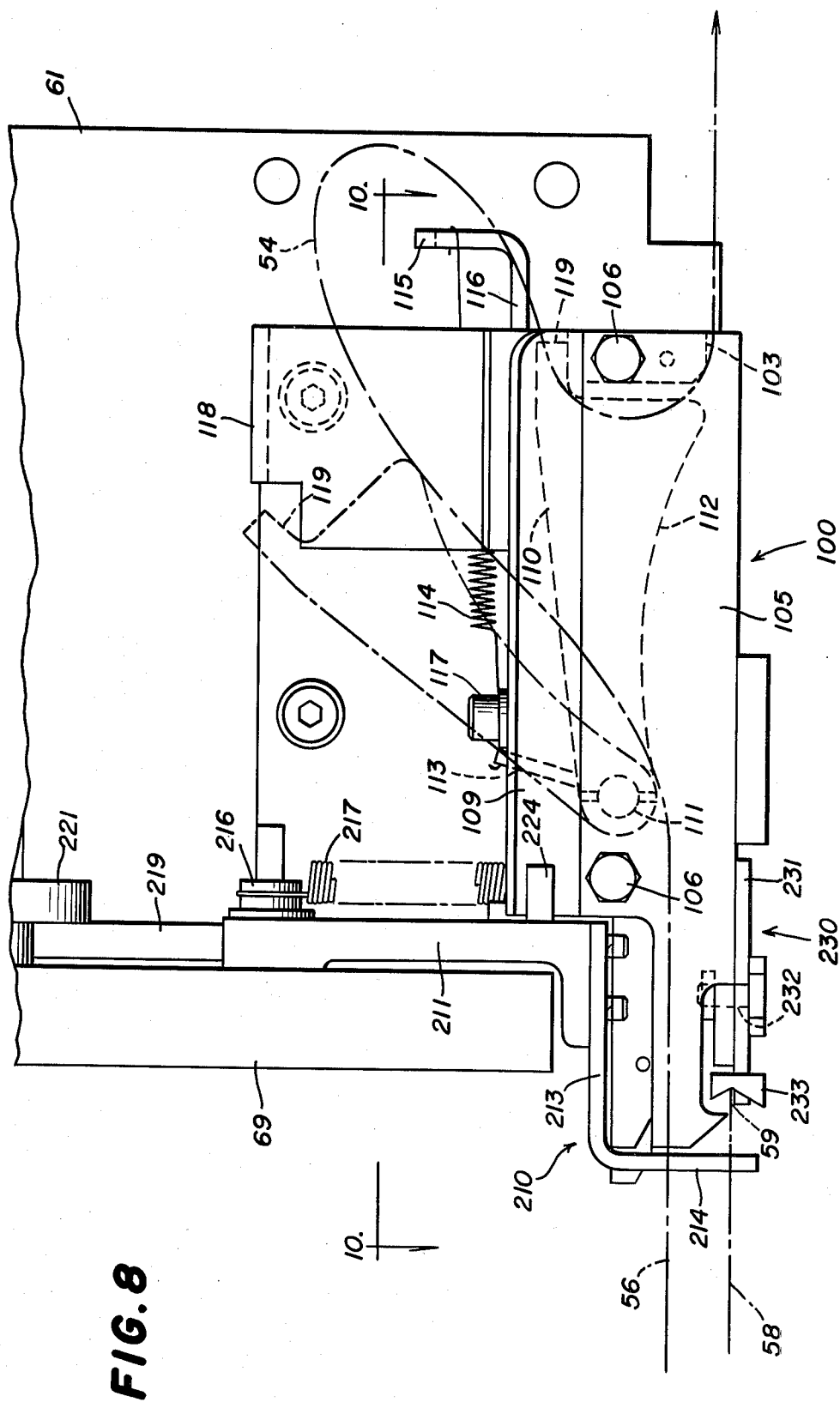
FIG. 8 is a fragmentary front elevational view of the portion of the strapping machine head illustrated in FIG. 7, as viewed from the left-hand side thereof.
Figure 9:
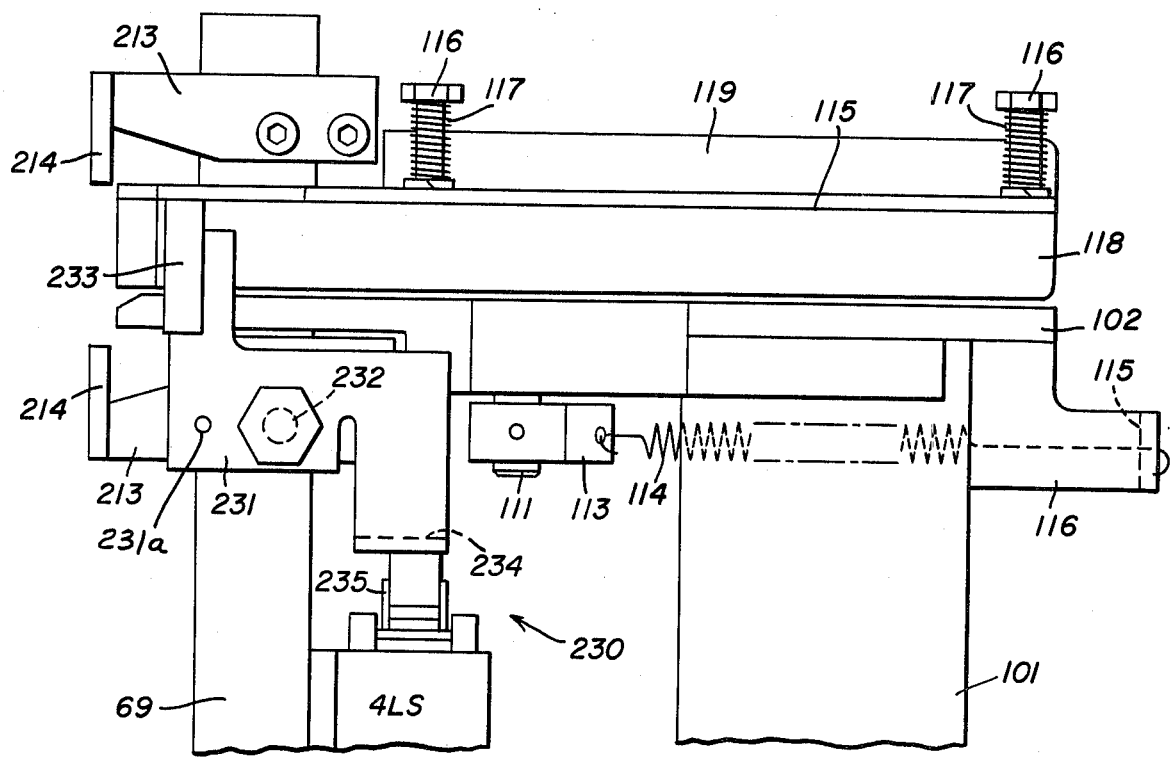
FIG. 9 is a fragmentary bottom plan view of the portion of the strapping machine head illustrated in FIG. 8.

The exit track assembly 100 also includes a yieldable top section 110 which is disposed between the spacer blocks 103 and 104 and between the side wall 102 and the exit side plate 105, the yieldable top section 110 being mounted for pivotal movement about a pivot pin 111 at the leading end thereof and having a lower guide surface 112 which defines the top wall of the strap track (see FIG. 8). Fixedly secured to the pivot pin 111 inwardly beyond the side wall 102 is a bracket 113 having coupled thereto one end of a helical tension spring 114, the other end of which is anchored on a tab 115 of a retaining bracket 116 which is fixedly secured to the top of the side wall 102 as by screws 117. The retaining bracket 116 includes a channelshaped retaining or guide arch 118 overlying the exit end of the yieldable top section 110, with the bight portion of the arch 118 disposed a predetermined distance above the yieldable top section 110. The yieldable top section 110 is provided at the distal end thereof with a finger 119 arranged to rest upon the spacer block 103 when the yieldable top section 110 is in its normal position illustrated in solid line in FIG. 7. It will be appreciated that the yieldable top section 110 is resiliently urged to its normal position by the tension spring 114, but is capable of pivotal upward movement to a release position, illustrated in broken line in FIG. 8, against the urging of the tension spring 114 for a purpose which will be described hereinafter.

Also mounted on the frame 60 above the strap path is a seal drive assembly, generally designated by the numeral 120, which includes an air motor 121 fixedly secured to the sealer frame plate 69 and having secured to the shaft thereof a pinion (not shown) which is disposed in meshing engagement with a gear plate 123 disposed within a gear housing 124 and fixedly secured to an elongated cam shaft 125 journaled in suitable bearings in the sealer frame plates 68 and 69 and extending substantially parallel to the portion of the strap path which passes through the sealing region 95. Mounted between the sealer frame plates 68 and 69 is a sealing assembly, generally designated by the numeral 130, which includes a sealer table 131 extending beneath the main plate 61 and beneath the portion of the strap path which passes through the sealing region 95 (see FIG. 5), the sealer table 131 being connected to an arm (not shown) which extends upwardly behind the cam shaft 125 and is provided at the upper end thereof with a hub 132 pivotally mounted on a pivot pin (not shown) which extends between the sealer frame plates 68 and 69 above the cam shaft 125. Integral with the hub 132 and extending upwardly therefrom is a bias finger 133 which is coupled by a tension spring (not shown) to the main plate 61 for resiliently urging the sealer table 131 to its normal position illustrated in FIG. 5.

Referring to FIG. 5, there is disposed above the entry end of the sealer table 131 a holding jaw 135 which is mounted for vertically reciprocating movement in a sealer housing 134 which is secured between the sealer frame plates 68 and 69 adjacent to the lower ends thereof. The holding jaw 135 has a generally U-shaped lower end which has a bight portion 136 provided with a lower holding surface 137 and an upper guide surface 138. The upper end of the holding jaw 135 projects upwardly above the sealer housing 134 and is there provided with a cam follower disposed in camming engagement with a cam 139 mounted on the cam shaft 125 for controlling the vertically reciprocating movement of the holding jaw 135, which is resiliently urged by suitable bias means (not shown) to a retracted position illustrated in FIG. 5.

Also disposed above the sealer table 131 is a strap separator, generally designated by the numeral 140, which includes an elongated lower lip 141 and a shorter, but wider upper lip 142 (see also FIG. 11) which are spaced apart by a slot 143. Integral with the rear end of the strap separator 140 and extending upwardly therefrom behind the cam shaft 125 is an arm (not shown) which is provided at the upper end thereof with a hub 144 pivotally mounted coaxially with the hub 132. Integral with the hub 144 and extending upwardly therefrom is a bias finger 145 which is coupled to a tension spring (not shown) for resiliently urging the strap separator 140 to a normal position, illustrated in FIG. 5, wherein the lower lip 141 is fully inserted between the overlapping strap portions 56 and 58 and with the slot 143 forming a portion of the track for the supply portion 56 of the strap, whereby the strap separator 140 maintains separation between the overlapping portions 56 and 58 of the strap in the sealing region 95. Also carried by the strap separator arm is a cam follower (not shown) which is disposed in camming engagement with a cam 146 on the cam shaft 125 for controlling pivotal movement of the strap separator 140 in a manner to be described more fully below.

Overlying the exit end of the sealer table 131 is a holding jaw 147 which is mounted for vertically reciprocating movement in the sealer housing 134 and is resiliently urged by suitable means (not shown) to a retracted position illustrated in FIG. 5. The holding jaw 147 is provided at the upper end thereof with a cam follower 148 disposed in camming engagement with a cam 149 mounted on the cam shaft 125 for controlling the vertical movement of the holding jaw 147.

The mechanical feeding and tensioning operations will now be briefly summarized. Initially, the air motor 78 operates in a direction so that the rotary dog 76 and feed wheel 71 cooperate to drive the supply portion 56 of the strap through the entry track assembly 90 and into the sealing region 95, where the leading end of the strap passes over the guide surface 138 of the holding jaw 135, through the slot 143 of the strap separator 140 and through the exit track assembly 100, and then is directed by track means (not shown) in a loop 57 around the associated object to be strapped. As the leading end 59 of the strap returns to the head 50 it reenters the entry track assembly 90 between the feed track member 91 and the entry side plates 93 and is then guided over the sealer table 131, but beneath the holding jaw 135 and the strap separator 140. Upon exiting the sealing region 95, the leading end of the strap is stopped by a stop member to be described below and the strap-feeding operation is stopped. The holding jaw 135 is then actuated to clamp the leading portion 58 of the strap against the sealer table 131, and the strap separator 140 is partially retracted to a position illustrated in FIG. 11, wherein the supply portion 56 of the strap is out of the slot 143, but still overlies the upper surface of the lower lip 141. The air motor 78 is then operated in the reverse direction for tensioning the strap loop 57 about the object to a tension, predetermined by adjustment of the air motor operating pressure, at which the air motor stalls out. The resultant force exerted by the tensioned strap on the feed wheel 71 serves to shift it about the axis of the shaft 73, thereby causing a slight rotation of the shaft 73 for driving the actuating finger 82 against the switch contact arm 83 to actuate the limit switch 3LS for energizing the air motor 121 to start the sealing cycle which then de-energizes the air motor 78, as will be explained below.

Figure 3:
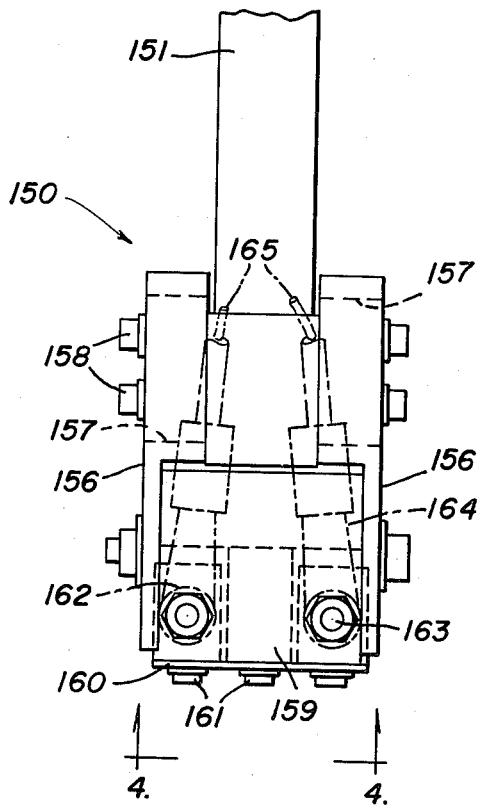
FIG. 3 is an enlarged fragmentary front elevational view of the lower end of the heating arm of the strapping machine head of FIG. 1.
Figure 4:
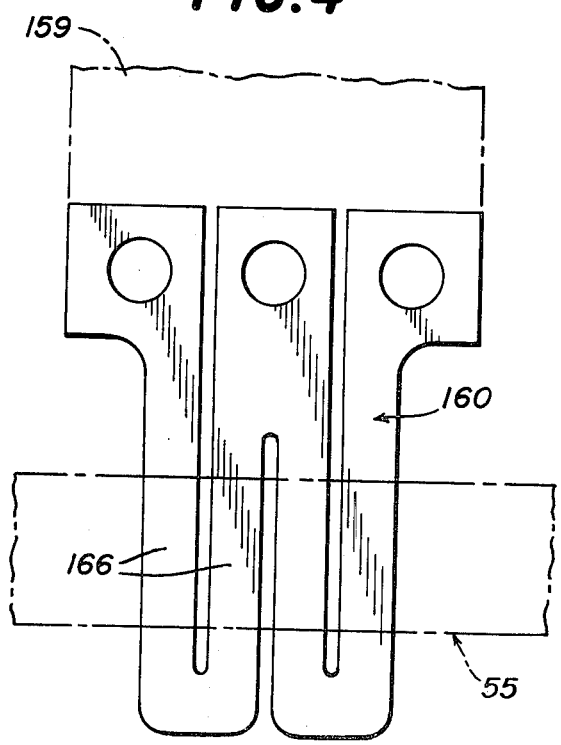
FIG. 4 is a further enlarged fragmentary bottom plan view of the heating arm taken along the line 4—4 in FIG. 3.
Figure 7:
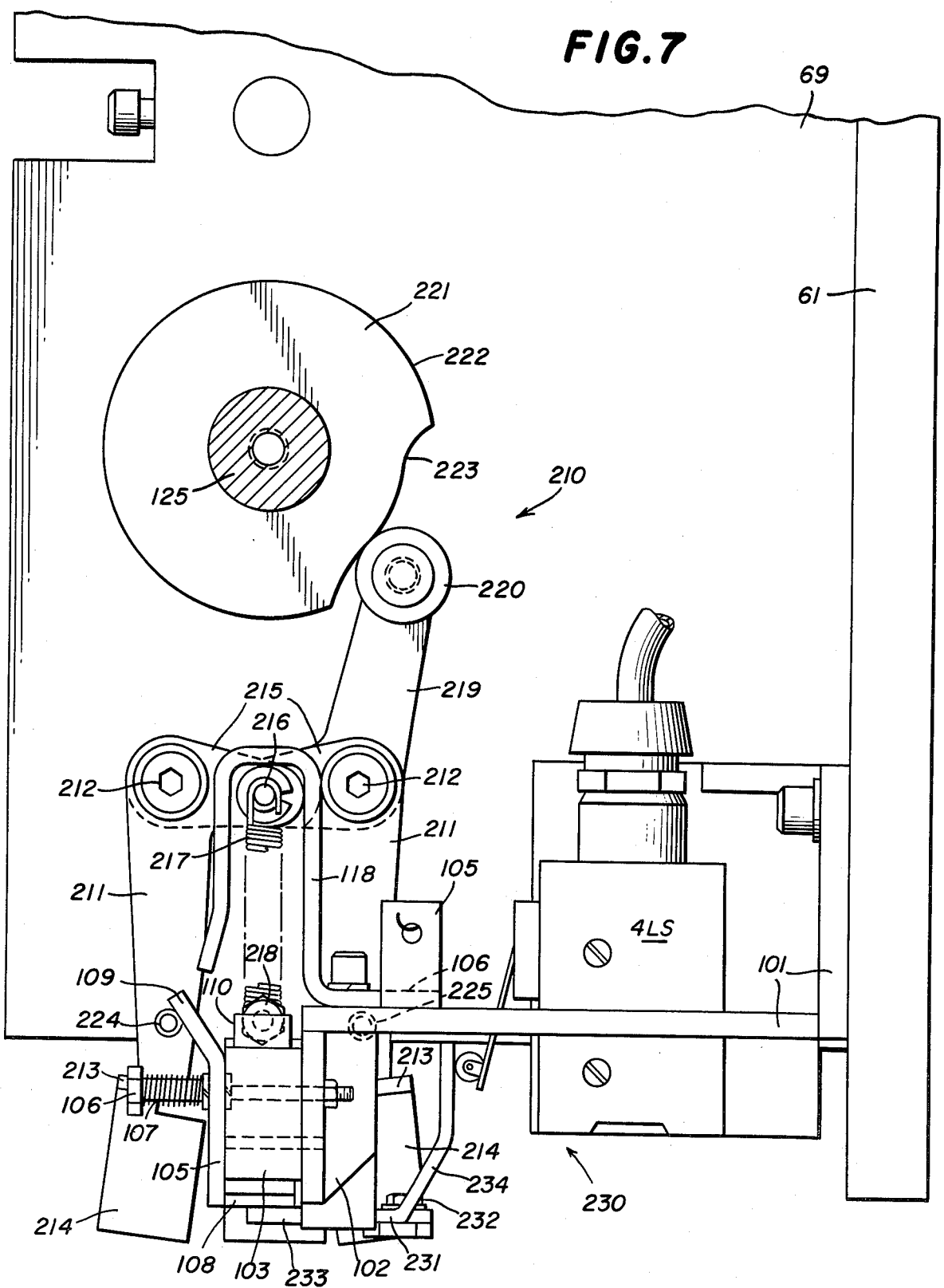
FIG. 7 is an enlarged fragmentary view in vertical section taken along the line 7—7 in FIG. 1.

Referring now also to FIGS. 3 and 4 of the drawings, the sealing assembly 130 includes a heater assembly, generally designated by the numeral 150, which includes an elongated heater arm 151 extending upwardly in front of the cam shaft 125 and provided at the upper end thereof with a hub 152 pivotally mounted coaxially with the hubs 132 and 144. Integral with the hub 152 and extending upwardly therefrom is a bias finger 153 which is coupled to the tension spring of the strap separator bias finger 145 for resiliently urging the heater assembly 150 to a heating position, diagrammatically illustrated in FIG. 12. Also carried by the heater arm 151 adjacent to the upper end thereof is a cam follower 154 disposed for camming engagement with a cam 155 mounted on the cam shaft 125 for controlling pivotal movement of the heater arm 151. The arms for the strap separator 140 and the heater assembly 150 are arranged generally in a scissors-like configuration so that the common bias tension spring therebetween simultaneously urges the lower ends of the arms toward each other, the heater assembly 150, however, being normally held in a retracted position, diagrammatically illustrated in FIG. 11, against the urging of the bias spring by the cam 155. Thus, it will be appreciated that there will be a tendency for movements of either the strap separator 140 or the heater assembly 150 to be followed by a corresponding movement of the other.

Respectively disposed on opposite sides of the heater arm 151 at the lower end thereof are two brackets 156, each provided with an elongated slot 157 through which are received fasteners 158 for securely mounting the brackets 157 on the heater arm 151. The brackets 156 extend downwardly below the lower end of the heater arm 151 and carry therebetween a ceramic block 159 secured by suitable fastening means. Fixedly secured to the lower surface of the ceramic block 159 and extending rearwardly therebeyond is a thin, flat blade-like heater element 160 which is in the form of an elongated strip of conductive material arranged in a flat, planar, sinuous path defining interconnected fingers 166. Fixedly secured to the opposite ends of the heater element 160 are terminals (not shown) which are in turn connected to connection posts 163 which extend rearwardly through complementary bores 162 and the ceramic block 159 and are connected at the rear ends thereof with terminals 164 for conductors 165 which extend to an associated electrical power source, as will be explained more fully below.

Referring now in particular to FIGS. 5 and 6 of the drawings, the sealing assembly 130 includes a pressure-applying assembly, generally designated by the numeral 170, which includes an elongated cylindrical base member 171 mounted for vertically reciprocating movement in the sealer housing 134 between the holding jaws 135 and 147. The base member 171 has a cylindrical bore 172 extending axially thereinto from the upper end thereof and has fixedly secured to the lower end thereof a shear member 173 provided with a shear blade 174 disposed for cooperation with a stationary shear blade 175 fixedly secured to the sealer housing 134. The stationary shear blade 175 is generally U-shaped and is disposed so that the supply portion 56 of the strap passes over the bight portion thereof and the leading portion 58 of the strap passes beneath the bight portion thereof at the end of the loop. Disposed immediately beneath the shear member 173 is a pressure block or pad 176 provided with an upwardly extending post 177 which extends upwardly through a complementary opening in the shear member 173, the upper end of the post 177 being rounded and seated in a conical recess 178 in the lower end of the base member 171. The post 177 is secured to the shear member 173 by a roll pin 179 which is loosely disposed in a complementary opening in the shear member 173. It will be appreciated that this loose coupling, as well as the seating in the conical recess 178, permits a slight universal tilting motion of the pressure block 176.

Disposed in the bore 172 of the base member 171 is a relatively heavy helical compression spring 180 having one or more shims 181 disposed thereon. Seated on top of the shims 181 in the bore 172 is a cylindrical cam follower holder 182 having a clevis-shaped upper end in which is received a cam follower roller 183 rotatably mounted on a shaft 184. Fixedly secured to the cam follower holder 182 adjacent to the lower end thereof and extending radially outwardly therefrom through a complementary opening 186 in the base member 171 is a guide pin 185 having coupled thereto one end of a tension spring 187, the other end of which is anchored to a bracket 188 secured to the sealer housing 134. It will be appreciated that the spring 187 resiliently urges the cam follower holder 182 and the base member 171 upwardly toward a retracted position illustrated in FIG. 5.

The cam follower roller 183 is disposed for camming engagement with a pressure cam, generally designated by the numeral 190, which is mounted on the cam shaft 125. The pressure cam 190 includes a radially outwardly extending cam plate 191 having a raised peripheral cam surface 192 and provided with a circumferentially elongated and radially inwardly extending recess 193. At the base of the recess 193 are formed two bores 194 in which are respectively seated two compression springs 195. Also fixedly secured to the cam plate 191 at the base of the recess 193 between the bores 194 and extending radially outwardly of the cam 190 is a guide pin 196. Formed through the side walls of the cam plate 191 which flank the recess 193 are two circular apertures 197 in which are respectively loosely disposed two roll pins 198. The pressure cam 190 also includes a cam segment 200 which is disposed in the recess 193 and is connected to the roll pins 198. The compression springs 195 bear against the inner surface of the cam segment 200 and resiliently urge it radially outwardly, this outward movement being limited by the engagement of the roll pins 198 in the apertures 197. The cam segment 200 is provided with an outer cam surface 201 and is provided on the inner surface thereof with a socket 202 in which is received the distal end of the guide pin 196. It will, thus, be appreciated that the cam segment 200 can be moved radially inwardly of the pressure cam 190 against the urging of the springs 195, this inward movement being guided by the guide pin 196.

It can be seen that as the pressure cam 190 rotates in a counterclockwise direction, as viewed in FIG. 6, the cam follower holder 182 will be driven downwardly and will, in turn, drive the base member 171 downwardly via the spring 180 for moving the pressure block 176 into engagement with the supply portion 56 of the strap. The spring 180 has a stiffness such that it will not compress during this movement. As the cam follower 183 rides up on the cam surface 201 of the cam segment 200, the springs 195 will yield to limit the force with which the pressure block 176 is pressed against the strap. The guide pin 196 will guide the inward movement of the cam segment 200 under the urging of the cam follower 183 so that the cam segment 200 does not tilt, thereby assuring even control of the pressure applied by the pressure block 176. As the rotation of the pressure cam 190 continues, the cam follower 183 will ride up on the cam surface 192, thereby serving to urge the pressure pad 176 against the strap with a greater force which will be limited by compression of the spring 180. The stiffness of the springs 180 and 195 are such that when the cam follower 183 is on the cam surface 192, the force applied to the strap is about ten times that applied when the cam follower 183 is on the cam segment 200.

Referring now in particular to FIGS. 7 through 10 of the drawings, there is illustrated a strap centering assembly, generally designated by the numeral 210, which includes two centering arms 211 respectively disposed on opposite sides of the strap path and generally normal thereto adjacent to the exit end of the sealing region 95 and extending substantially parallel to the sealer frame plate 69. The centering arms 211 are respectively pivotally mounted adjacent to the upper ends thereof on pivot pins 212 secured to the sealer frame plate 69. Fixedly secured to each of the centering arms 211 at the lower end thereof is a centering bracket 213 which extends generally parallel to the strap path toward the sealing region 95, and is provided at the distal end thereof with a centering finger 214 extending therefrom substantially normal thereto and to the strap path, the centering fingers 214 respectively extending downwardly below the strap path on opposite sides thereof. Respectively carried by the centering arms 211 at the upper ends thereof are coupling arms 215 which extend toward each other in overlapping relationship and are pivotally coupled together by a coupling pin 216. Secured to the coupling pin 216 is one end of a return spring 217, the other end of which is anchored to an anchor pin 218 on the sealer frame plate 69, the return spring 217 resiliently urging the centering arms 211 laterally outwardly to a normal retracted position illustrated in FIGS. 7 and 9.

Integral with one of the centering arms 211 at the upper end thereof and extending upwardly therefrom is a cam follower arm 219 provided at the upper end thereof with a rotatably mounted cam follower roller 220 disposed in camming engagement with a cam 221 mounted on the cam shaft 125. The cam 221 has a high cam surface 222 and a low cam surface 223, the latter being in engagement with the cam follower 220 when the strap centering assembly 210 is in its normal retracted position. It will be appreciated that as the cam 221 rotates in a counterclockwise direction, as viewed in FIG. 7, the cam follower roller 220 will ride up on the high cam surface 222, thereby urging the centering arms 211 and the centering fingers 214 laterally inwardly toward the strap path against the urging of the spring 217 to a centering position (not shown), wherein the centering fingers 214 are closely adjacent to the strap and serve to limit lateral movement of the strap in the strap path.

Fixedly secured to one of the centering arms 211 is a roll pin 224 disposed in camming engagement with the cam flange 109 of the exit side plate 105. It will be appreciated that as the strap centering assembly 210 is moved to its centering position, the roll pin 224 will urge the cam flange 109 inwardly, thereby tilting the retaining flange 108 of the exit side plate 105 laterally outwardly against the urging of the springs 107, thereby releasing the strap from the exit track assembly 100. Fixedly secured to the other of the centering arms 211 is a roll pin for a purpose to be described below.

A track switch assembly, generally designated by the numeral 230, is mounted adjacent to the entry end of the exit track assembly 100, and includes a lever plate 231 pivotally mounted by a pivot screw 232 to a mounting bracket 235. A small pin 231a extends upwardly from the lever plate 231 through a notch 231b in the mounting bracket 235. Integral with the lever plate 231 at one end thereof and extending forwardly therefrom into the lower path of the leading end of the strap as it exits the sealing region 95 for the second time at the completion of the loop is a stop finger 233. Extending upwardly from the inner end of the lever plate 231 is an actuating finger 234 disposed for engagement with the switch contact arm of a limit switch 4LS mounted on the sealer frame plate 69. The mounting bracket 235 is provided with a pivot arm 236 which extends upwardly therefrom and then downwardly to a distal end which is pivotally mounted on a pivot pin 237 carried by the spacer block 104. Surrounding the pivot pin 237 and in engagement with the pivot arm 236 is a torsion spring 238 which resiliently urges the mounting bracket 235 to a normal position illustrated in the drawings, wherein the stop finger 233 is disposed in the strap path. The pivot arm 236 has an aperture 239 therethrough in which is received the roll pin 225 of the centering arm 211.

Figure 10:
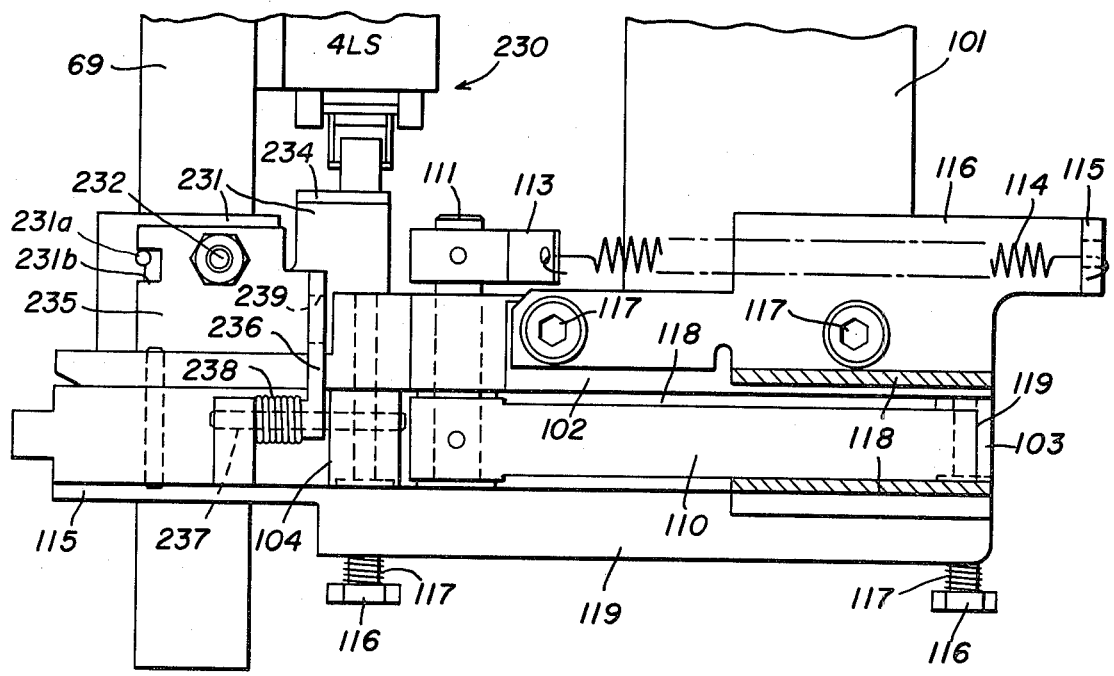
FIG. 10 is a fragmentary view in horizontal section taken along the line 10—10 in FIG. 8.

When the strap centering assembly 210 moves to its centering position, the roll pin 225 pivots the mounting bracket 235 upwardly, as viewed in FIG. 10, against the urging of the torsion spring 238 for retracting the stop finger 233 from the strap path. It will be appreciated that the bias spring of the contact arm of the limit switch 4LS resiliently urges the lever plate 231 in a counterclockwise direction, as viewed in FIG. 9, about the pivot screw 232, this rotation being limited by engagement of the pin 231a against the edge of the notch 231b. When the leading end 59 of the strap engages the stop finger 233 after formation of the loop 57 is completed (see FIG. 8), this engagement pivots the lever plate 231 slightly about the axis of the pivot screw 232 for driving the actuating finger 234 against the contact arm of the limit switch 4LS for actuating same, this actuating movement being limited by the engagement of the pin 231a at the other side of the notch 231b.

Referring again to FIG. 1 of the drawings, there is mounted on the cam shaft 125 outboard of the sealer frame plate 69 a plurality of switch cams 240, 241, 242 and 243 for respectively controlling the operations of limit switches 6LS, 1LS, 2LS and 5LS, as will be explained in greater detail below in connection with the electrical control circuit of FIG. 19.

Continuing with the summary of the mechanical feeding and tensioning operation of the head 50, as was explained above, when the leading end 59 of the strap engages the stop finger 233 at the completion of formation of the loop 57, it actuates the limit switch 4LS for de-energizing the air motor 78. Because the pivotal movement of the stop finger 233 is limited by the pin 231a and notch 231b, the stop finger 233 acts as a positive stop for the leading end 59 of the strap. After the air motor 78 is de-energized, it may coast slightly and, therefore, during the brief time interval between the engagement of the leading end 59 of the strap with the stop finger 233 and the complete stopping of the air motor 78, a small amount of excess strap may be fed into the loop 57. Because the leading end 59 of the strap cannot move further, a shock wave is set up in the loop which travels back therealong and urges the yieldable top section 110 of the exit track assembly 100 upwardly to the release position (see FIG. 8), creating an opening in the track through which the excess strap may escape in a loop or bubble 54, thereby preventing the strap from being jammed in the track. The retaining arch 118 limits the upward formation of the strap bubble 54 and guides its formation to the right, as viewed in FIG. 8.

Now, summarizing the mechanical strap sealing operation of the head 50, the configuration illustrated in FIGS. 5 through 8, i.e., at the completion of the feeding of the strap around the loop, is the initial condition for the sealing cycle of the head 50. At this point, the operator manually throws a switch in a control circuit, to be explained below, for initiating the cycle. Initially, the air motor 121 is energized for rotating the cam shaft 125 through a predetermined slight angular rotation sufficient to lower the holding jaw 135 to clamp the leading portion 58 of the strap against the sealer table 131 and for partially withdrawing the strap separator 140 to the position illustrated in FIG. 11. Simultaneously, the strap centering arms 211 are moved inwardly to their strap centering position through the operation of the cam 221. This inward movement of the strap centering arms 211 causes the roll pin 224 to engage the cam flange 109 for tilting the exit side plate 105 and opening the exit track assembly 100, and the roll pin 225 engages the pivot arm 236 of the track switch assembly 230 for retracting the stop finger 233 from the strap path. When this brief rotation of the cam shaft 125 ceases, the air motor 78 is re-energized and driven in a tensioning direction for withdrawing the excess strap in the bubble 54 and tensioning the loop 57 about the associated object, the air motor 78 stalling out when the predetermined tension is reached, in the manner described above.

It will be appreciated that during this tensioning operation, the supply portion 56 of the strap is drawn across the upper surface of the lower lip 141 of the strap separator 140, this tensioning being facilitated by the opening of the exit track assembly 100 so that the loop 57 of strap can be pulled snugly up against the associated object. Similarly, the resilient mounting of the entry side plates 93 of the entry track assembly 90 permits them to be pulled open under the pressure of the tightening strap loop 57 so that the strap loop 57 is completely freed from the head 50 except at the sealing region 95, where if is prevented from pulling away by the sealer table 131. When the limit switch 3LS is actuated, the air motor 121 is reenergized for again rotating the cam shaft 135 for lowering the holding jaw 147 to clamp the overlapping strap portions against the sealer table 131, this operation of the holding jaw 147 being accommodated by the partial withdrawal of the strap separator 140. The air motor 78 is then de-energized through operation of the limit switch 2LS, releasing the tension in the supply portion 56 of the strap, the tension in the loop 57 being held by the holding jaws 135 and 147. But the overlapping strap portions in the sealing region 95 between the holding jaws 135 and 147 are in an untensioned condition, which is important for the proper sealing and severing of the strap.

The continued rotation of the cam shaft 125 drives the head 50 through the sealing portion of its cycle in which the strap separator 140 is completely withdrawn from between the overlapping strap portions to a second intermediate position and, simultaneously, the heater element 160 is inserted between the overlapping strap portions. More particularly, the cam 155 releases the heater assembly 150 to be drawn to its heating position of FIG. 12 by the bias means coupled to the withdrawn strap separator. In order to prevent the heater element 160 from actually contacting the receding strap separator 140 and possibly damaging the heater element 160, mechanical spacer means (not shown) are mounted on the bias fingers 133 and 145 to insure the maintenance of a minimum predetermined separation therebetween. The pressure block 176 is then lowered for clamping the overlapping strap portions and the heater element 160 together between the pressure block 176 and the sealer table 131 with a relatively light force limited by the yielding of the cam segment 200, as was described above. As the pressure block 176 lowers, the shear member 173 cooperates with the stationary shear blade 175 to sever the supply portion 56 of the strap upstream of the holding jaw 147. The contact of the heater element 160 with the overlapping strap portions causes the facing surfaces thereof to melt.

While this light pressure is being applied by the sealer pressure assembly 170, the heater element 160 is withdrawn, wiping across the overlapping strap portions which are immediately pressed together as the heater element 160 is withdrawn from therebetween. Thus, the melted faces of the overlapping strap portions are immediately brought into contact with each other under light pressure before they have a chance to cool and begin to re-solidify, thereby insuring that the overlapping strap portions will be brought into contact while still in the melted condition, even in the case of polyester strap. It will be appreciated that the universal tilting ability of the pressure block 176 allows it to find a firm seat against the overlapping strap portions and heater element 160, thereby automatically compensating for any nonparallel condition in these elements and preventing uneven heating which might be caused thereby.

As soon as the heater element 160 has been withdrawn, the cam follower 183 rides up on the high cam surface 192 of the pressure cam 190 for applying a heavy compressive force to the overlapping strap portions to effect a firm joint therebetween, this force being limited by the compression spring 180. As the cam shaft 125 continues to rotate, the pressure block 176 and the holding jaws 135 and 147 are retracted, and the strap separator 140 is fully retracted, this latter retraction also effecting a retraction of the sealer table 131 through the action of a drive pin (not shown) carried by the arm of the strap separator 140 and engageable with the arm of the sealer table 131. Upon retraction of the sealer table 131, the sealed and tensioned strap loop 57 pops out of the head 50 and against the associated strapped object, which can then be replaced by a new object to be strapped. On continued rotation of the cam shaft 125, the sealer table 131 and strap separator 140 are released to be returned to their original positions by their associated bias springs and, likewise, the strap centering arms 211 return to their normal retracted position, thereby allowing the stop finger 233 to return to its normal position in the strap path. The air motor 121 is then de-energized and the air motor 78 is re-energized for feeding another length of strap around the next package, the air motor 78 being de-energized when the leading end 59 of the strap engages the stop finger 233, as was described above, to complete the cycle.

Figure 15:
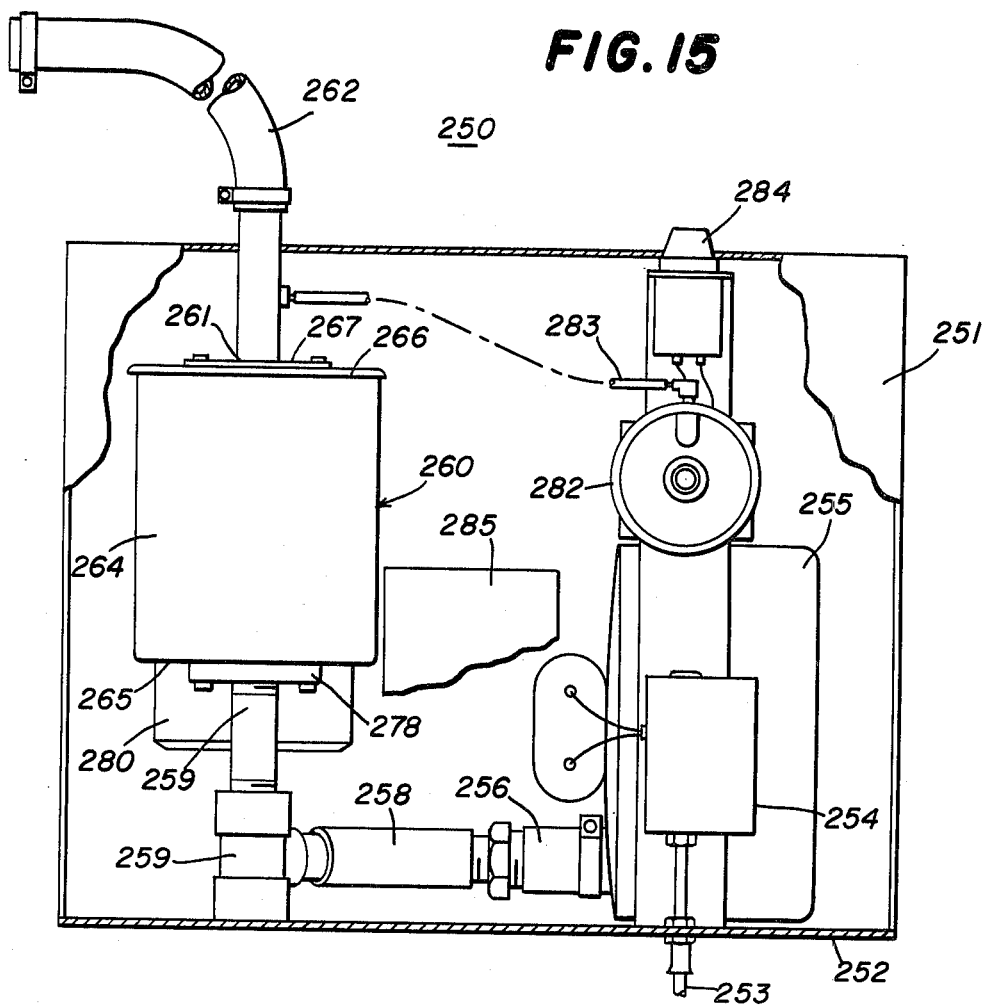
FIG. 15 is a side elevational view of the air filter assembly used with the strapping machine of the present invention, with a portion of the housing broken away to more clearly illustrate the components of the filter assembly.
Figure 16:
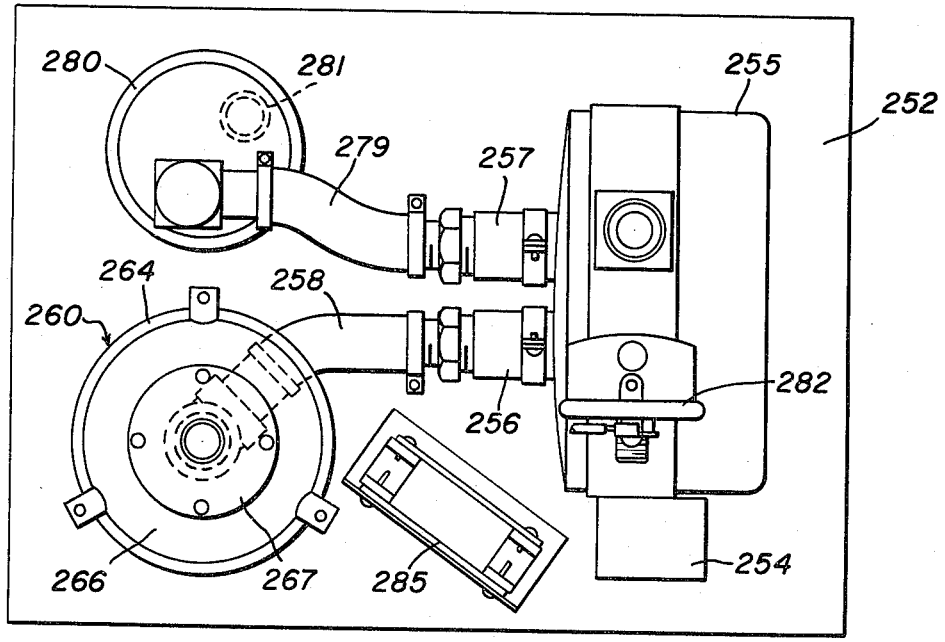
FIG. 16 is a top plan view of the filter assembly illustrated in FIG. 15.

It has been found that during the heat sealing of plastic strap there is produced an undesirable amount of noxious fumes and particulate debris, such as burned plastic powder. Thus, referring to FIGS. 15 through 17 of the drawings, there is provided a filter assembly, generally designated by the numeral 250, for removing these gaseous and particulate waste products. The filter assembly 250 includes a generally box-like housing 251 which may be mounted remotely from the head 50, and includes a bottom wall or floor 252 through a complementary opening in which is received an electrical conductor 253 leading to an electrical junction box 254 attached to the side of a suction blower 255 mounted on the floor 252. Preferably, the filter assembly is operated from a 110-volt, 60 Hz, single-phase power source, and suitable control switches (not shown) may be provided as desired. The suction blower 255 has an inlet port 256 and an outlet port 257, the former being coupled by a conduit 258 to a support coupling which is supported on the floor 252 and extends upwardly therefrom for connection to and communication with the outlet port of a filter canister, generally designated by the numeral 260. The filter canister 260 has an inlet port 261 to which is coupled one end of a conduit 262, the other end of which communicates with a plenum housing 263 (not shown) mounted on the sealer frame plate 69 immediately adjacent to the sealing region 95 and communicating therewith.

The filter canister 260 has a cylindrical side wall 264 closed by a circular bottom wall 265 and provided with a removable top wall or lid 266 to which is fixedly secured a coupler seal 267 for the conduit 262. The top wall 266 has a circular aperture 268 centrally therethrough defining the inlet port of the filter canister 260. Disposed within the filter canister 260 is a cylindrical paper filter element 270, the lower and upper ends of which are respectively closed by annular seal plates 269 and 271, the former resting upon the bottom wall 265 of the filter canister 260, and the latter being covered by a circular cover plate 272. Secured to the cover plate 272 centrally thereof is a coupler 273 which extends downwardly therebelow and is in turn coupled to the upper cap 274 of a cylindrical charcoal filter element 275 which is disposed within the paper filter element 270 coaxially therewith and spaced a predetermined distance therefrom. The charcoal filter element 275 is also provided with a lower cap 276 provided with a central outlet conduit which communicates with the outlet port 277 in the bottom wall 265 of the filter canister 260, this coupling element and the upper end of the support coupling 259 being respectively provided with annular coupler seals 278 which are securely fastened to the bottom seal plate 269 of the paper filter element 270 and the bottom wall 265 of the filter canister 260.

The outlet port of the suction blower 255 is coupled by a conduit 279 to the inlet port of a muffler 280 which is supported on the floor 252 of the housing 251, the muffler 280 having an exhaust port 281 at the lower end thereof which communicates with the atmosphere. Mounted on top of the suction blower 255 is a vacuum switch 282 which is coupled by a conduit 283 to the conduit 262 at the inlet of the filter canister 260 for monitoring the pressure therein. Also mounted on the suction blower 255 coupled to the vacuum switch 282 is a warning lamp 284 which preferably extends outwardly of the housing 251 to provide a warning indication when the suction becomes too low. Also mounted on the floor 252 of the housing 251 is a cooling fan 285 for cooling the suction blower 255.

In operation, the suction blower 255 creates a stream of air which draws vapors and particulate matter from the sealing region 95 through the plenum housing 263 and the conduit 262 to the filter canister 260. The airstream passes downwardly around the outside of the paper filter element 270 and then flows radially inwardly therethrough and through the charcoal filter element 275, the paper filter element 270 serving to remove any particulate matter in the airstream, and the charcoal filter element 275 filtering out any noxious fumes or vapors in the airstream. The airstream then exits the charcoal filter element 275 at the lower end thereof and passes from the filter canister 260 through the supporting coupling 259 and the conduit 258 to the suction blower 255 and then through the conduit 279 to the muffler 280. It will be appreciated that the filter assembly 250 affords an efficient and compact filter arrangement, the suction of the blower 255 being sufficient that the filter assembly 250 may be positioned up to about twenty feet from the head 50.

Referring now to FIG. 18 of the drawings, there is illustrated a pneumatic control circuit, generally designated by the numeral 290, for controlling the operation of the air motors 78 and 121 of the present invention. The control circuit 290 includes a supply line 291 connected to an associated source of pressurized air, the supply line 291 leading through suitable filter, regulator and lubricating devices and thence in parallel to the inlet ports of the pneumatic valves 65, 66 and 67, each of which is a solenoid-actuated valve. In the normal condition of the valve 66, the inlet port thereof is internally connected to a conduit 295 which is coupled through a check valve 296 to the exhaust port of the seal air motor 121. Since free flow through the check valve 296 is in the direction indicated by the arrow, the air motor 121 is de-energized when the valve 66 is in its normal condition illustrated in FIG. 18. The inlet port of the air motor 121 is connected through a conduit 297 to another port of the valve 66, such that when the valve 66 is actuated to its open condition, the conduit 297 is connected to the supply line 291 and the conduit 295 is connected to atmosphere for driving the air motor 121.

The inlet port of the valve 65 is blocked when that valve is in its normal closed condition, illustrated in FIG. 18. One port of the feed and tension air motor 78 is connected through a conduit 299 to another port of the valve 65 which is normally communicating with the atmosphere. Similarly, the inlet port of the valve 67 is internally blocked, and the other port of the air motor 78 is connected by a conduit 299 to another port of the valve 67 which is normally communicating with the atmosphere when that valve is in its closed condition. When the valve 67 is actuated to its open condition with the valve 65 remaining in its closed condition, the conduit 299 is connected to the supply line 291 for driving the air motor 78 in a feeding direction. When the valve 65 is actuated to its open condition, with the valve 67 in its normal closed condition, the conduit 298 is connected to the supply line 291 for driving the air motor 78 in a tensioning direction.

Referring now to FIG. 19 of the drawings, there is illustrated the electrical control circuit for the present invention, generally designated by the numeral 300. The control circuit 300 includes a pair of input conductors 301 and 302 which are connected across an associated source of 110-volt, 60 Hz, single-phase power. The conductor 301 is connected through a fuse 303 and a manually-operable ON-OFF switch 304. Connected across the conductors 301 and 302 is a lamp 305 for indicating when the switch 304 is closed and power is supplied to the system. Also connected across the conductors 301 and 302 is the series combination of a pushbutton cycle-start switch 306 and the coil 307a of a control relay 307. Connected in parallel with the switch 306 is the series combination of a normally-open pole 1LSA of the limit switch 1LS and normally-open contacts 307b of the relay 307, the junction therebetween being connected to a conductor 308. Connected between the conductors 302 and 308 is the series combination of the normally-closed, held open limit switch 2LS and the coil 309a of a control relay 309. Connected in parallel with the coil 309a is a tension solenoid 314 for controlling the tension valve 65 of the air motor 78. Also connected between the conductors 302 and 308 is the series combination of the normally-open limit switch 3LS and the coil 310a of a time delay relay 310, which has normally-open, delayed-closing contacts 310b connected in parallel with the limit switch 3LS. Also connected across the conductors 302 and 308 is the series combination of the normally-open limit switch 5LS and the coil 311a of a time delay relay 311.

Connected in parallel with the cycle-start switch 306 is the series combination of normally-open contacts 307c of the relay 307 and normally-closed, delayed-opening contacts 311b of the relay 311. Connected in parallel with the relay coil 307a is the series combination of normally-open, delayed-closing contacts 311c of the relay 311, normally-closed contacts 309b of the relay 309 and a seal solenoid 313 for controlling the operation of the valve 66 of the air motor 121. Connected in parallel with the contacts 309b are normally-open, delayed-closing contacts 310c of the relay 310. Connected in parallel with the relay coil 311a is the coil 312a of a relay 312, which has normally-open contacts 312b connected in parallel with the limit switch 5LS and normally-closed contacts 312c connected in parallel with the relay contacts 311c.

Connected across the conductors 301 and 302 is the series combination of a normally-closed pole 1LSB of the limit switch 1LS, the normally-open limit switch 4LS and the coil 315a of a control relay 315. Connected in series from the junction between the limit switches 1LSB and 4LS to the conductor 302 is the series combination of normally-closed contacts 315b of the relay 315 and a feed solenoid 316 for controlling the operation of the valve 67 of the air motor 78. The control relay 315 also has normally-open contacts 315c connected in parallel with the limit switch 4LS. Connected in series between the conductors 301 and 302 is the normally-closed selector switch 317, a normally-open pole 6LSB of the limit switch 6LS and the primary winding of a transformer 319, the secondary of which is connected across the terminals of the heater element 160. Connected in parallel with the limit switch pole 6LSB is the series combination of a heater control circuit 318 and a normally-closed pole 6LSA of the limit switch 6LS. Preferably, the heater control circuit 318 is a solid-state phase control circuit for reducing the voltage applied thereto, and the limit switch 6LS has an OFF time delay.

Referring now to the circuit diagrams of FIGS. 18 and 19 and the diagrammatic representations of FIGS. 11 through 14, the operation of the strapping machine head 50 through a complete cycle will now be described in detail. At the beginning of the cycle, i.e., when the system is stopped after the feeding of a new length of strap in a loop around an object, the pneumatic control circuit 290 and the electrical control circuit 300 are in the conditions illustrated in FIGS. 18 and 19, the leading end 59 of the strap will be in engagement with the stop finger 233, with any excess fed strap disposed in a bubble 54 projecting outwardly through the open yieldable top section 110 of the exit track assembly 100, as illustrated in FIG. 8. The limit switch 4LS is held closed by the leading end 59 of the strap, thereby energizing the control relay 315 through the limit switch pole 1LSB, whereby the relay contacts 315b are opened for de-energizing the feed solenoid 316 and, thereby, the feed air motor 78, and the relay contacts 315c are closed for latching the relay 315 in its energized condition.

The other parts of the head 50 will be as illustrated in the drawings, except that the strap separator 140 will be disposed in an initial condition to the left of the position illustrated in FIG. 11, so that the supply portion 56 of the strap is disposed in the slot 143. Typically, the head 50 is designed to be operated repeatedly and, generally, the ON-OFF switch 304 will be closed at the beginning of an operating day and will remain closed, and the selector switch 317 will be disposed in the ON position. Thus, the heater element 160 will be continuously energized through the heater control 318, the pole 6LSA of the limit switch 6LS and the transformer 319. In this normal condition, about 1¼ volts AC are applied to the heater terminals, with the heater drawing a large current which heats it to a temperature in the range of from about 950° F. to about 1,050° F. The lamp 305 is lit to show that power is supplied to the system. All of the other relays and solenoids are de-energized, whereby the valves 65, 66 and 67 are all closed and the air motors 78 and 121 are de-energized.

When the operator desires to initiate a sealing cycle, he momentarily closes the cycle-start switch 306, thereby energizing the relay 307 and closing the contacts 307b and 307c thereof, the relay 307 being latched in its energized condition through the relay contacts 307c and 311b. The seal solenoid 313 is energized through the relay contacts 307c, 311b, 312c and 309b, thereby shifting the valve 66 to its open condition for applying air to the inlet port of the air motor 121 and driving same. The cam shaft 125 is thereby rotated for switching of the limit switch 1LS by the cam 241 and closing of the limit switch 2LS by the cam 242, thereby energizing the relay 309 through limit switches 1LSA and 2LS and opening the contacts 309b thereof for de-energizing the seal solenoid 313. The valve 66 is thus shifted back to its closed condition and the air motor 121 stops after having rotated through about a 45-degree angle. During this brief rotation of the cam shaft 125, the holding jaw 135 is closed by the cam 139 for securely clamping the leading portion 58 of the strap against the sealer table 131, and the cam 146 operates partially to retract the strap separator 140 to the position illustrated in FIG. 11, wherein the supply portion 56 of the strap is freed from the slot 143 and rests above the distal end of the lower lip 141.

During this same brief rotation of the cam shaft 125, the cam follower 220 rides up on the high cam surface 222 of the cam 221 for moving the strap centering assembly 210 to its centering position with the centering fingers 214 disposed inwardly closely adjacent to the opposite side edges of the strap for preventing lateral deflection thereof during the tensioning operation. This movement of the strap centering assembly 210 to its centering position also serves to tilt the exit side plate 105 for retracting the retaining flange 108 thereof through the operation of the roll pin 224, and retracts the stop finger 233 from the track path through the operation of the roll pin 225, as described above. During this retraction of the stop finger 233, the actuating finger 234 moves further toward the contact arm of the limit switch 4LS so that that switch is still held in its closed condition. But when the limit switch 1LS is switched, the pole 1LSB opens to de-energize the relay 315, whereby the contacts 315b reclose and the contacts 315c reopen. The opening of the limit switch pole 1LSB insures that the feed solenoid 316 will remain de-energized during the tensioning and sealing portions of the cycle.

The closing of the limit switch 2LS also serves to energize the tension solenoid 314, thereby shifting the valve 65 to its open condition for applying pressurized air to the air motor 78 over the conduit 298 and driving the air motor 78 in a tensioning direction to tension the strap. Thus, referring to FIGS. 5 and 8 of the drawings, the supply portion 56 of the strap is moved to the left, in a direction opposite the arrows, thereby taking up any slack in the strap, as in the bubble 54, and tightening the strap loop 57 about the associated object. When the desired tension has been reached, the resultant force exerted on the feed wheel 71 by the tensioned strap will shift the feed wheel 71 in a counterclockwise direction, as viewed in FIG. 1, about the axis of the shaft 73, thereby rotating the shaft 73 in a clockwise direction, as viewed in FIG. 2, for closing the limit switch 3LS and energizing the time delay relay 310. The air motor 78 stalls when the predetermined tension is reached, and after a predetermined short time period the contacts 310b and 310c close for latching the relay 310 energized and for re-energizing the seal solenoid 313 to restart the sealing air motor 121.

As the cam shaft 125 begins to rotate again, the cam 149 drives the holding jaw 147 downwardly for clamping the tensioned overlapping strap portions securely against the sealer table 131. The cam 242 reopens the limit switch 2LS for de-energizing the tension solenoid 314 and thereby turning off the air motor 78 to release the tension in the supply portion 56 of the strap between the feed wheel 71 and the holding jaw 147, the tension in the loop 57 around the object being maintained by the holding jaws 135 and 147. The reopening of the limit switch 2LS also de-energizes the relay 309 for closing the contacts 309b thereof. The release of tension in the supply portion 56 of the strap permits the feed wheel 71 to fall back to its original position, thereby reopening of the limit switch 3LS, the relay 310 remaining energized through its contacts 310b.

As the cam shaft 125 continues to rotate, the cam 146 retracts the strap separator 140 still further to a second intermediate position wherein the lower lip 141 is completely withdrawn from between the overlapping strap portions and, simultaneously, the cam 155 is releasing the heater assembly 150 for driving the heater element 160 between the overlapping strap portions, to the position illustrated in FIG. 12 under the urging of the associated bias means. Preferably, the cam 155 and the mechanical linkage between the strap separator 140 and the heater assembly 150 are so arranged that the strap separator 140 will not have completely withdrawn from between the overlapping strap portions until the leading end of the heater element 160 has entered therebetween, thereby to insure that there will be adequate separation between the overlapping strap portions to permit unencumbered entrance of the heater element 160 therebetween, while at the same time preventing contact of the heater element 160 with the strap separator 140.

After the heater element 160 has been fully inserted between the overlapping strap portions, the cam follower 183 (see FIG. 6) rides up onto the yieldable cam segment 200 of the pressure cam 190 for driving the pressure-applying assembly 170 to a first pressing condition, illustrated in FIG. 12, wherein the pressure block 176 cooperates with the sealer table 131 to press the overlapping strap portions securely against the intervening heater element 160 with a relatively light pressure, the universal tilting capability of the pressure block 176 insuring a firm seat of the overlapping strap portions against the heater element 160 for even heating thereof. As the pressure-applying assembly 170 moves to this first pressing condition, the shear member 173 cooperates with the stationary shearing blade 175 to sever the supply portion 56 of the strap just upstream of the sealing region 95. The heater element 160 melts the facing surfaces of the overlapping strap portions and, immediately thereafter, the cam 155 operates to pull the heater element 160 back to its retracted position, as indicated in FIG. 13. This retraction occurs while the pressure block 176 continues to apply its light compressive force to the overlapping strap portions, so that the heater element 160 is wiped across the facing surfaces of the overlapping strap portions during retraction and, as the heater element 160 is retracted, the melted overlapping strap surfaces immediately contact each other before having a chance to cool and resolidify.

When the heater element 160 has been completely retracted, the continued rotation of the cam shaft 125 rides the cam follower 183 up onto the high cam surface 192 of the pressure cam 190, thereby moving the pressure-applying assembly 170 to a second pressing condition for pressing together the overlapping melted strap portions with an increased pressure, as indicated in FIG. 14, firmly to join the melted portions of the strap. When the pressure-applying assembly 170 has moved to this second pressing condition, the cam 243 closes the limit switch 5LS and the cam 240 switches the limit switch 6LS for opening the pole 6LSA thereof and closing the pole 6LSB. This switching of the limit switch 6LS causes the heater transformer 319 to be energized directly from the power lines, bypassing the heater control 318, so that full line voltage is applied to the primary of the transformer 319, and approximately four volts AC is applied to the terminals of the heater element 160, thereby raising the temperature thereof to a second temperature range between approximately 1,400° F. and 1,500° F. This higher temperature is sufficient for burning off any plastic residue which may have accumulated on the heater element 160 as a result of the wiping action during its retraction from between the overlapping strap portions.

The closure of the limit switch 5LS energizes the time delay relay 311 and the control relay 312, thereby closing the contacts 312b for latching the relays 311 and 312 energized and for opening the contacts 312c to de-energize the seal solenoid 313 and to stop the air motor 121 and the cam shaft 125. After a predetermined short time period between one-half second and one second, the contacts 311b open and the contacts 311c close for re-energizing the seal solenoid 313 through the limit switch pole 1LSA and the relay contacts 307b, thereby restarting the air motor 121. This brief delay maintains the high pressure on the overlapping strap portions for a sufficient time to insure a firm joint therebetween.

As the cam shaft 125 resumes rotation, the cam 240 switches the limit switch 6LS back, after a brief delay, to its original condition, wherein the heater element 160 is energized through the heater control 318, whereby it returns to its normal low temperature range. It will be appreciated that the approximately one-second to four-second application of high voltage to the heater element 160 serves not only to burn off accumulated deposits thereon, but also quickly restores the thermal energy lost during the melting of the overlapping strap portions. Substantially simultaneously with the switching of the limit switch 6LS, the cam 243 reopens the limit switch 5LS, the relays 311 and 312 being maintained energized through the relay contacts 312b. On continued rotation of the cam shaft 125, the cam follower 183 rides off of the cam surface 192 of the pressure cam 190, permitting the pressure-applying assembly 170 to return to its fully retracted position under the urging of the return spring 187 for releasing the pressure on the sealed strap. Furthermore, the cams 139 and 149, respectively, release the holding jaws 135 and 147 for return to their retracted positions under the urging of their corresponding bias means and, substantially simultaneously, the cam 146 drives the strap separator 140 to a fully retracted position. During this complete retraction of the strap separator 140, a drive pin thereon (not shown) engages the sealer table arm for retracting the sealer table 131. As the sealer table 131 is retracted, the tensioned and sealed strap pops out of the head 50, this release being permitted by the previous retraction of the retaining flange 108, the exit track assembly 100 and the stop finger 233 of the track switch assembly 230. Thus, the strapped object can now be removed and replaced by a new object to be strapped.

On continued rotation of the cam shaft 125, the cam 146 releases the strap separator 140, whereby it returns to its original strap-separating position under the urging of its associated bias means, and simultaneously the sealer table 131 returns to its original position under the urging of its bias means. Similarly, the cam follower 220 falls back into the low cam portion 223 of the cam 221, thereby permitting the strap centering assembly 210 to be returned to its retracted position under the urging of the tension spring 217. It will be appreciated that this movement also permits the exit side plate 105 of the exit track assembly 100 to return to its normal position and permits the track switch assembly 230 to return to its normal position, thereby opening the limit switch 4LS. Finally, the dam 241 switches the limit switch 1LS back to its original position, reopening the pole 1LSA and reclosing the pole 1LSB.

The opening of the pole 1LSA de-energizes the seal solenoid 313 for stopping the air motor 121 and the cam shaft 125, and de-energizes the relay 307 for reopening the contacts 307b and 307c thereof. The opening of the pole 1LSA also de-energizes the relays 311 and 312, returning their contacts to their original conditions. The closure of the limit switch pole 1LSB re-energizes the feed solenoid 316 through the normally-closed relay contacts 315b for closing the valve 67 and driving the air motor 78 in a feeding direction to feed a new length of strap around the next object. This feeding operation continues until the leading end 59 of the strap re-engages the stop finger 233 to close the limit switch 4LS, thereby re-energizing the relay 315, the contacts 315b of which open to de-energize the feed solenoid 316 and stop the air motor 78, and the contacts 315c of which close to latch the relay 315 energized. The cycle is now complete and all of the components of the control circuit 300 have been returned to their initial conditions illustrated in FIG. 19. The next cycle is started by again momentarily closing the cycle-start switch 306.

From the foregoing, it can be seen that there has been provided an improved strapping machine head for the heat-sealing of plastic strap, this improved head being uniquely suitable for use with polyester strap.

More particularly, there has been provided a heat-sealing strapping apparatus which insures the formation of strong heat-sealed joints in plastic strap, even when the strap is made of a polyester material, which prevents the buildup of plastic residue from the melted straps on the heater element, which prevents the buildup of noxious gaseous and particulate by-products of the heat-sealing operation in the vicinity of the strapping apparatus, and which provides for accurate control of the strap-feeding process in a manner substantially to eliminate strap waste from overfeed while at the same time preventing strap jamming during the feeding operation.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Heat sealing apparatus for use in a strapping machine for applying plastic strap around an object with the leading end of the strap overlapping and spaced from the supply portion thereof in a strap-sealing region, said heat sealing apparatus comprising a heating element movable between a strap-heating position disposed in said sealing region between the overlapping portions of the strap and a retracted position displaced from between the overlapping portions of the strap, pressure-applying means operable when said heating element is in the strap-heating position thereof to a first pressing condition pressing the overlapping strap portions against said heating element for melting the facing surfaces of the overlapping strap portions, said pressure-applying means including first resilient means operable in the first pressing condition for controlling the pressure with which the overlapping strap portions are pressed against said heating element, and means for moving said heating element to the retracted position thereof while said pressure-applying means is in its first pressing condition so that the melted overlapping portions of the strap are pressed together as said heating element is withdrawn from therebetween, said pressure-applying means including means effecting operation thereof to a second pressing condition after said heating element is moved to its retracted position for increasing the force with which the melted overlapping portions of the strap are pressed together thereby to insure the formation of a solid joint therebetween, said pressure-applying means including second resilient means operable in the second pressing condition for controlling the pressure with which the overlapping strap portions are pressed together.

2. The apparatus of claim 1, wherein each of said first and second resilient means includes a helical compression spring.

3. The apparatus of claim 1, wherein the pressure with which the overlapping strap portions are pressed together in the second pressing condition is approximately ten times that in the first pressing condition.

4. The apparatus of claim 1, and further including timing means coupled to said pressure-applying means for maintaining said pressure-applying means in its second pressing condition for a predetermined minimum time period sufficient to insure formation of a solid joint between the overlapping portions of the strap.

5. Heat sealing apparatus for use in a strapping machine for applying plastic strap around an object with the leading end of the strap overlapping and spaced from the supply portion thereof in a strap-sealing region, said heat sealing apparatus comprising a heating element movable between a strap-heating position disposed in said sealing region between the overlapping portions of the strap and a retracted position displaced from between the overlapping portions of the strap, pressure-applying means including movable pressing means and cam means engageable with said pressing means for effecting movement thereof, said cam means including a first resiliently yieldable portion engageable with said pressing means when said heating element is in the strap-heating position thereof for resiliently moving said pressing means to a first pressing condition pressing the overlapping strap portions against said heating element with a predetermined limited force for melting the facing surfaces of the overlapping strap portions, and means for moving said heating element to the retracted position thereof while said pressing means is in the first pressing condition thereof so that the melted overlapping portions of the strap are pressed together as said heating element is withdrawn from therebetween, said cam means having a second portion engageable with said pressing means after said heating element has been moved to the retracted position thereof for effecting movement of said pressing means to a second pressing condition to increase the force with which the melted overlapping portions of the strap are pressed together thereby to insure the formation of a solid joint therebetween, said pressing means including control means for limiting the pressure with which the overlapping strap portions are pressed together in the second pressing condition.

6. The apparatus of claim 5, wherein said cam means includes a compression spring for resiliently urging said yieldable portion to a normal condition, said yieldable portion moving against the urging of said compression spring in the first pressing condition when the predetermined limited force is reached.

7. The apparatus of claim 5, wherein said pressing means includes a hollow cylindrical member, said control means comprising a helical compression spring received in said cylindrical member, and said cam means including cam follower means slidably received in said hollow member and coupled thereto and engageable with said compression spring, whereby in its second pressing condition said pressing means is driven by said cam follower member with a force which is limited by said compression spring.

8. The apparatus of claim 5, wherein the pressure with which the overlapping strap portions are pressed together in the second pressing condition is approximately ten times that in the first pressing condition.

9. The apparatus of claim 5, wherein said cam means includes guide means for guiding the yielding movement of said yieldable portion.

10. Heat sealing apparatus for use in a strapping machine for applying plastic strap around an object with the leading end of the strap overlapping and spaced from the supply portion thereof in a strap-sealing region, said heat sealing apparatus comprising a heating element movable between a strap-heating position disposed in said sealing region between the overlapping portions of the strap and a retracted position displaced from between the overlapping portions of the strap, pressure-applying means operable when said heating element is in the strap-heating position thereof to a pressing condition pressing the overlapping strap portions against said heating element for melting the facing surfaces of the overlapping strap portions, said pressure-applying means including a base member having a socket therein and a strap-contacting pressure block and universal joint means coupling said pressure block to said base member for accommodating tilting movement of said pressure block for facilitating firm even contact between the strap and said heating element, said universal joint means including a mounting member fixedly secured to said base member and having an aperture therethrough communicating with said socket, said pressure block including a coupling member having a ball portion thereon extending through said aperture and into said socket for ball-and-socket engagement therewith, means pivotally coupling said coupling member to said mounting member, and means for moving said heating element to the retracted position thereof while said pressure-applying means is in its pressing condition so that the melted overlapping portions of the strap are pressed together as said heating element is withdrawn from therebetween.

11. The apparatus of claim 10, wherein said mounting member includes a shear blade thereon for shearing the supply portion of the strap when said pressure-applying means moves to the pressing condition thereof.

12. Heat sealing apparatus for use in a strapping machine for applying plastic strap around an object with the leading end of the strap overlapping and spaced from the supply portion thereof in a strap-sealing region, said heat sealing apparatus comprising a heating element movable between a strap-heating position disposed in said sealing region between the overlapping portions of the strap and a retracted position displaced from between the overlapping portions of the strap, energizing means connected to said heating element for heating thereof and switchable between first and second energizing conditions, said energizing means in the first energizing condition thereof heating said heating element to a temperature in a first predetermined temperature range sufficient for melting the facing surfaces of the overlapping portions of the strap, said energizing means in the second energizing condition thereof heating said heating element to a temperature in a second predetermined temperature range above said first predetermined range and sufficient for burning from said heating element residues picked up from the melted portions of the strap, pressure-applying means operable when said heating element is in the strap-heating position thereof to a first pressing condition pressing the overlapping strap portions against said heating element for melting the facing surfaces of the overlapping strap portions, said pressure-applying means including first resilient means operable in the first pressing condition for controlling the pressure with which the overlapping strap portions are pressed against said heating element, means for moving said heating element to the retracted position thereof while said pressure-applying means is in its first pressing condition so that the melted overlapping portions of the strap are pressed together as said heating element is withdrawn from therebetween, said pressure-applying means including means effecting operation thereof to a second pressing condition after said heating element is moved to its retracted position for increasing the force with which the melted overlapping portions of the strap are pressed together thereby to insure the formation of a solid joint therebetween, said pressure-applying means including second resilient means operable in the second pressing condition for controlling the pressure with which the overlapping strap portions are pressed together, and switching means for switching said energizing means from the first energizing condition to the second energizing condition thereof when said heating element is in the retracted position thereof.

13. The apparatus of claim 12, wherein the first predetermined temperature range is from about 950° F. to about 1,050° F. and said second predetermined temperature range is from about 1,400° F. to about 1,500° F.

14. The apparatus of claim 21, wherein said switching means includes means for automatically switching said energizing means from said first energizing condition to said second energizing condition when the heating element is moved to its retracted position and for automatically switching said energizing means from the second energizing condition back to said first energizing condition prior to the next movement of the heating element to its strap-heating position.

15. Heat sealing apparatus for use in a strapping machine for applying plastic strap around an object with the leading end of the strap overlapping and spaced from the supply portion thereof in a strap-sealing region, said heat sealing apparatus comprising a heating element movable between a strap-heating position disposed in said sealing region between the overlapping portions of the strap and a retracted position displaced from between the overlapping portions of the strap, pressure-applying means including movable pressing means and cam means engageable with said pressing means for effecting movement thereof, said cam means including a resiliently yieldable portion engageable with said pressing means when said heating element is in the strap-heating position thereof for moving said pressing means to a pressing condition pressing the overlapping strap portions against said heating element with a predetermined limited force for melting the facing surfaces of the overlapping strap portions, and means for moving said heating element to the retracted position thereof while said pressing means is in the pressing condition thereof so that the melted overlapping portions of the strap are pressed together as said heating element is withdrawn from therebetween, a filter chamber containing coarse and fine filter elements, conduit means having one end thereof communicating with said filter chamber and the other end thereof disposed adjacent to the sealing region, and means for establishing a stream of air from said sealing region through said conduit means and said filter elements, whereby particulate and gaseous waste products of the heat-sealing operation are carried by the stream of air from the sealing region to said coarse and fine filter elements for removal respectively thereby.

* * * * *